(12) United States Patent
Mitsunaga et al.

(10) Patent No.: US 6,298,155 B1
(45) Date of Patent: Oct. 2, 2001

(54) APPARATUS AND METHOD FOR GENERATING TIME-SERIES DATA, APPARATUS AND METHOD FOR EDITING CURVES AND RECORDING MEDIUM HAVING PROGRAM RECORDED THEREON

(75) Inventors: Tomoo Mitsunaga; Taku Yokoyama, both of Kanagawa; Takashi Totsuka, Chiba; Hidehiro Hirase, Kanagawa, all of (JP); John Zeiss, Stamford, CT (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/124,711

(22) Filed: Jul. 29, 1998

(30) Foreign Application Priority Data

Jul. 31, 1997 (JP) .................................................. 9-206983

(51) Int. Cl.$^7$ ...................................................... G06K 9/66
(52) U.S. Cl. ............................................................. 382/190
(58) Field of Search ................................... 382/190, 191, 382/192, 193, 186, 187, 188, 313, 314, 315, 316; 341/20; 178/18.01

(56) References Cited

U.S. PATENT DOCUMENTS

| 5,287,105 | * | 2/1994 | Schlotterbeck et al. | 341/20 |
| 5,832,119 | * | 11/1998 | Rhoads | 382/232 |
| 5,880,411 | * | 3/1999 | Gillespie et al. | 178/18.01 |

FOREIGN PATENT DOCUMENTS

| 1-155476 | 6/1989 | (JP) | G06F/15/60 |
| 1-175076 | 7/1989 | (JP) | G06F/15/62 |
| 2-105152 | 4/1990 | (JP) | G03F/1/00 |
| 3-17680 | 1/1991 | (JP) | G03G/21/00 |
| 3-291770 | 12/1991 | (JP) | G06F/15/70 |
| 4-68763 | 3/1992 | (JP) | H04N/1/38 |
| 4-90544 | 3/1992 | (JP) | G03F/1/00 |
| 4-152481 | 5/1992 | (JP) | G06F/15/70 |
| 4-254854 | 9/1992 | (JP) | G03F/1/00 |
| 5012443 | 1/1993 | (JP) | G06F/15/70 |
| 5-61977 | 3/1993 | (JP) | G06F/15/70 |
| 8-312740 | 11/1996 | (JP) | F16H/7/14 |
| 9204862 | 8/1997 | (JP) | H01H/37/52 |

* cited by examiner

Primary Examiner—Andrew W. Johns
Assistant Examiner—Seyed Azarian
(74) Attorney, Agent, or Firm—Bell, Boyd & Lloyd LLC

(57) ABSTRACT

An apparatus and a method for generating time-series data, an apparatus and a method for editing curves and a recording medium having a recorded program in which the corresponding relation between curves at different time junctures is obtained from given corresponding points such as to prevent the curve shape from becoming dull due to smoothing. A candidate point string extraction unit checks the relation between the input point coordinate and the corresponding relation information to set each group of input points having the corresponding relation as a corresponding point string. An interpolation curve generating unit calculates an interpolation curve C(t) interpolating the corresponding point string along the time axis. An extraction time juncture extraction unit extracts the extraction time junctures ts of the corresponding point string for which the corresponding points are not acquired and calculates the curve I2(t) at the extraction time junctures ts and the passage position C(ts) of the interpolation curve I2(ts). The corresponding point calculating unit 105 calculates the corresponding point P(ts) at the extraction time juncture ts from the curve I2(t) and the passage position C(ts) of the interpolation curve I2(ts). A curve editing device is also provided by employing this time-series data generating device.

23 Claims, 26 Drawing Sheets

12(t1)  12(t2)  12(t3)  12(t4)  12(t5)

12(t1)  12(t2)  12(t3)  12(t4)  12(t5)

APPARATUS AND METHOD FOR GENERATING TIME-SERIES DATA, APPARATUS AND METHOD FOR EDITING CURVES AND RECORDING MEDIUM HAVING PROGRAM RECORDED THEREON

BACKGROUND OF THE INVENTION

1. Field of the Invention

This invention relates to an apparatus and a method for generating time-series data, an apparatus and a method for editing curves and a recording medium having a program recorded thereon.

2. Description of Related Art

The processing of extracting an object shape from plural picture data is frequently performed in computer-aided design (CAD), computer graphics and in a variety of picture processing operations. In particular, there is a processing of formulating a key signal required in effecting picture synthesis processing. This key signal, also termed a mask, is the information required in slicing an area of a foreground object desired to be synthesized. In picture synthesis, it is felt to be crucial to extract a particularly accurate key signal, that is accurate contour shape.

The relevant contour extracting technique may be classified in two as to the operating method.

The first relevant technique is to extract the contour automatically after initially affording the information for the contour. The information to be given first is the rough shape information of the contour by drawing a rough closed curve in the vicinity of the contour to be extracted or the information of the color or texture necessary for discriminating the contour.

The former may be exemplified by techniques such as "area extraction method" described in Japanese Laying-Open Patent H3-17680, "area extraction apparatus" described in Japanese Laying-Open Patent H5-61977 and "Contour Tracing method for moving objects" described in Japanese Laying-Open Patent H5-12443.

The latter may be exemplified by "slicing mask producing system" described in Japanese Laying-Open Patent H2-105152 and "slicing mask producing method and Apparatus" described in Japanese Laying-Open Patent H4-90544.

The second relevant technique is of the type in which an operator produces the shape as he or she sets the position or direction of the contour in detail and has more interactive operating characteristics. It is proposed to designate plural points on a contour to generate the shape between the points, to act on control points of a parametric curve representing the contour shape or to directly enter the contour shape by a mouse.

This technique is disclosed for example, in "picture contour detecting method" in Japanese Laying-Open Patent H4-152481 or in "slicing mask producing method and apparatus" in Japanese Laying-Open Patent H4-254854.

In the processing for generating a key or a mask, it is necessary that an accurate contour shape be obtained for a picture of the entire frame. In a motion picture or a television picture, since hundreds of keys are required for synthesizing a picture continuing for several seconds, the processing volume is significant. Therefore, contour extraction processing automatically executed with as small a number of inputs as possible, such as the first relevant technique, is desirable.

However, the current state of the art cannot achieve contour shape extraction completely, such that, for obtaining keys that can stand utilization to picture synthesis, it is indispensable that the operator partially corrects the contour by manual operation to realize a more accurate contour shape. As a technique for aiding this correction, an interactive technique such as the second relevant technique is desirable.

However, the following problem arises in the relevant contour extraction technique.

Basically, the relevant contour extraction technique effects independent processing from frame to frame to realize the contour shape for each frame. Thus, sufficient processing accuracy cannot be achieved depending on picture characteristics, such as luminance or bleeding, with the contour position changing delicately from frame to frame. Even if accurate contour extraction appears to be achieved, the contour line, which should exhibit smooth movement, tends to be fluctuated if the frame is viewed in its entirety.

Moreover, if contour extraction is done in each frame using an interactive technique as in the second relevant technique, operator input errors are also responsible for fluctuations. Since partial manual correction is indispensable in key generation for producing a key that can be used safely for picture generation, problems of frame-to-frame contour fluctuations is presented unavoidably.

In general, for suppressing fluctuations in time-series data, smoothing in the time axis is used frequently. This smoothing in the time axis is also effective in suppressing the above-mentioned frame-to-frame contour fluctuations. However, the method for smoothing contour shape data along the time axis suffers from the following inconveniences.

For effectuating smoothing, respective positions on the contour need to be associated from frame to frame. In the relevant contour extraction technique, frame-based processing is independent, as described above, such that frame-to-frame contour position correspondence is not realized, so that this correspondence needs to be realized separately.

The overall length of the contour differs from frame to frame, the shape is changed with time or data start position on the contour differs from frame to frame, depending on the particular contour data generating method employed, such that automatic corresponding point tracking becomes difficult.

If, for avoiding the above problem, a curve defined by a pre-set number of parameters is used, correspondence can be achieved from parameter to parameter, so that parameter-based smoothing is possible. However, since complexity of the shape of a curve that can be represented by a pre-set number of parameters is fixed, accurate contour extraction becomes infeasible.

On the other hand, it is extremely labor-consuming to give necessary corresponding points by a manual operation in their entirety.

It is seen from above that such a method is required which consists of giving a certain number of corresponding points manually and to estimate other corresponding points based on these given points.

Although the processing of smoothing time-series data is effective in suppressing data fluctuations, as described above, shape dullness results due to elimination of high frequency components of time-series data.

In the case of contour data in a picture, a phenomenon may arise in which contour data of a moving object cannot follow the contour of the object in the original picture to lead to significant deterioration of contour accuracy.

SUMMARY OF THE INVENTION

It is therefore an object of the present invention to provide a method and apparatus for generating time-series data, a curve editing method and apparatus and a recording medium having a program recorded thereon, in which, if a certain number of corresponding points are given manually, other corresponding points are estimated from the given points, and in which it is possible to evade the phenomenon where contour data of a moving object cannot follow the contour of the object in the original picture.

In one aspect, the present invention provides a time-series data generating apparatus for generating, from time series I(t) of data distributed in space, time series P(t) of corresponding coordinates, including interpolation curve generating means for receiving an incomplete set of the corresponding coordinates as input for generating an interpolation curve C(t) interconnecting the coordinates, candidate point extraction means for receiving the interpolation curve C(t) and a time series I(t) of data as inputs for extracting a group of candidate points Q of a coordinate P(ts) to be found at a time juncture ts devoid of a corresponding coordinate from the neighborhood of a position C(ts) of the interpolation curve at time ts, and evaluated value calculating means for receiving the time ts, interpolation curve C(t), time series of data I(t) and a candidate point q of the group of candidate points as inputs for calculating an evaluated value e(q) for the candidate point q, and candidate point selection means for receiving the evaluation value e(q) as an input for detecting the point q having the maximum or minimum evaluation value E.

In another aspect, the present invention provides a time-series data generating method for generating, from time series I(t) of data distributed in space, time series P(t) of corresponding coordinates, including interpolation curve generating means for receiving an incomplete set of the corresponding coordinates as input for generating an interpolation curve C(t) interconnecting the coordinates, a candidate point extraction step of receiving the interpolation curve C(t) and the time series of data as inputs for extracting, from the neighborhood of the position C(ts) of the interpolation curve at time ts, a group Q of candidate points of the coordinates P(ts) to be found at time ts for which corresponding coordinate has not been acquired, an evaluated value calculating step of receiving the time juncture ts, interpolation curve C(ts), time series of data I(t) and a candidate point of the group Q of candidate points as inputs for calculating an evaluated value e(q) for the candidate point and a candidate point selection step for detecting the point q having the maximum or minimum evaluation value E.

In a further aspect, the present invention provides a recording medium having recorded thereon a time-series data generating program for generating, from time series I(t) of data distributed in space, time series P(t) of corresponding coordinates, including interpolation curve generating means for receiving an incomplete set of the corresponding coordinates as input for generating an interpolation curve C(t) interconnecting the coordinates, a candidate point extraction step of receiving the interpolation curve C(t) and the time series of data as inputs for extracting, from the neighborhood of the position C(ts) of the interpolation curve at time ts, a group Q of candidate points of the coordinates P(ts) to be found at time ts for which corresponding coordinate has not been acquired, an evaluated value calculating step of receiving the time juncture ts, interpolation curve C(ts), time series of data I(t) and a candidate point of the group Q of candidate points as inputs for calculating an evaluated value e(q) for the candidate point and a candidate point selection step for detecting the point q having the maximum or minimum evaluation value E.

In a further aspect, the present invention provides a time-series data generating apparatus for generating, from time series I(t) of data distributed in space, time series P(t) of corresponding coordinates, including corresponding point interpolation means for receiving a time series of a curve i(t) and an incomplete set of candidate points representing the relation between curves at each time juncture for interpolating the incomplete set of candidate points, smoothing means for smoothing the interpolated candidate points along the time axis and curve re-constructing means for re-constructing a curve shape form smoothed corresponding points.

In a further aspect, the present invention provides a time-series data generating method for generating, from time series I(t) of data distributed in space, time series P(t) of corresponding coordinates, including a corresponding point interpolating step of receiving time series I(t) of a curve and an incomplete set of corresponding points representing the corresponding relation between curves at respective time junctures, as inputs, for interpolating incomplete coordinates, a smoothing step of smoothing the interpolated corresponding points along the time axis and a curve re-constructing step of the curve shapes at the respective time junctures from the smoothed corresponding points.

In a further aspect, the present invention provides a recording medium having a time-series data generating program for generating, from time series I(t) of data distributed in space, time series P(t) of corresponding coordinates, said time-series data generating program wherein the time-series data generating program includes a corresponding point interpolating step of receiving time series I(t) of a curve and an incomplete set of corresponding points representing the corresponding relation between curves at respective time junctures, as inputs, for interpolating incomplete coordinates, a smoothing step of smoothing the interpolated corresponding points along the time axis and a curve re-constructing step of the curve shapes at the respective time junctures from the smoothed corresponding points.

In a further aspect, the present invention provides a curve editing apparatus for smoothing corresponding points on each contour curve of a time series of a contour curve along the time axis for reducing displacements along time axis between the contour curves, including point setting means for setting points at optional positions on the curves at optional time juncture of the time series of a contour curve I(t), corresponding setting means for setting whether or not each point is a corresponding point, weighting setting means for setting weighting coefficients of respective points and curve deforming means for receiving a time series of a curve I(t) and an incomplete set of coordinate points representing the corresponding relation between curves at respective time junctures as inputs for interpolating the incomplete coordinate points, smoothing the interpolated corresponding points along the time axis and for re-constructing a curve at each time juncture from the smoothed corresponding points at a time.

In a further aspect, the present invention provides a curve editing method for smoothing corresponding points on each contour curve of a time series of a contour curve along the time axis for reducing displacements along time axis between the contour curves, including a point setting step for setting points at optional positions on the curves at optional time juncture of the time series of a contour curve I(t), a corresponding setting step for setting whether or not each point is a corresponding point, a weighting setting step for setting weighting coefficients of respective points and a curve deforming step for receiving a time series of a curve I(t) and an incomplete set of coordinate points representing the corresponding relation between curves at respective time junctures as inputs for interpolating the incomplete coordinate points, smoothing the interpolated corresponding points along the time axis and for re-constructing a curve at each time juncture from the smoothed corresponding points at a time.

In yet another aspect, the present invention provides a recording medium having recorded thereon a curve editing program for smoothing corresponding points on each contour curve of a time series of a contour curve along the time axis for reducing displacements along time axis between the contour curves, the curve editing program including a point setting step for setting points at optional positions on the curves at optional time juncture of the time series of a contour curve I(t), a corresponding setting step for setting whether or not each point is a corresponding point, a weighting setting step for setting weighting coefficients of respective points and a curve deforming step for receiving a time series of a curve I(t) and an incomplete set of coordinate points representing the corresponding relation between curves at respective time junctures as inputs for interpolating the incomplete coordinate points, smoothing the interpolated corresponding points along the time axis and for re-constructing a curve at each time juncture from the smoothed corresponding points at a time.

According to the present invention, there are provided an apparatus and a method for generating time-series data, an apparatus and a method for editing curves and a recording medium having a program recorded thereon, in which, given a certain number of corresponding points, the remaining corresponding points can be estimated and in which the phenomenon of the object contour data in motion ceasing to follow the object contour in the original picture can be eliminated by smoothing.

According to the present invention, there are provided an apparatus and a method for generating time-series data, an apparatus and a method for editing curves and a recording medium having a program recorded thereon, in which, given a certain number of corresponding points, the remaining corresponding points can be estimated and interpolated, the corresponding relation between data at respective time junctures can be derived automatically, and in which, since processing in smoothing the time-series curve is done with weighting, there is no risk of the curve shape becoming dull due to elimination of the high frequency components.

DESCRIPTION OF THE PREFERRED EMBODIMENTS

Figure 1:
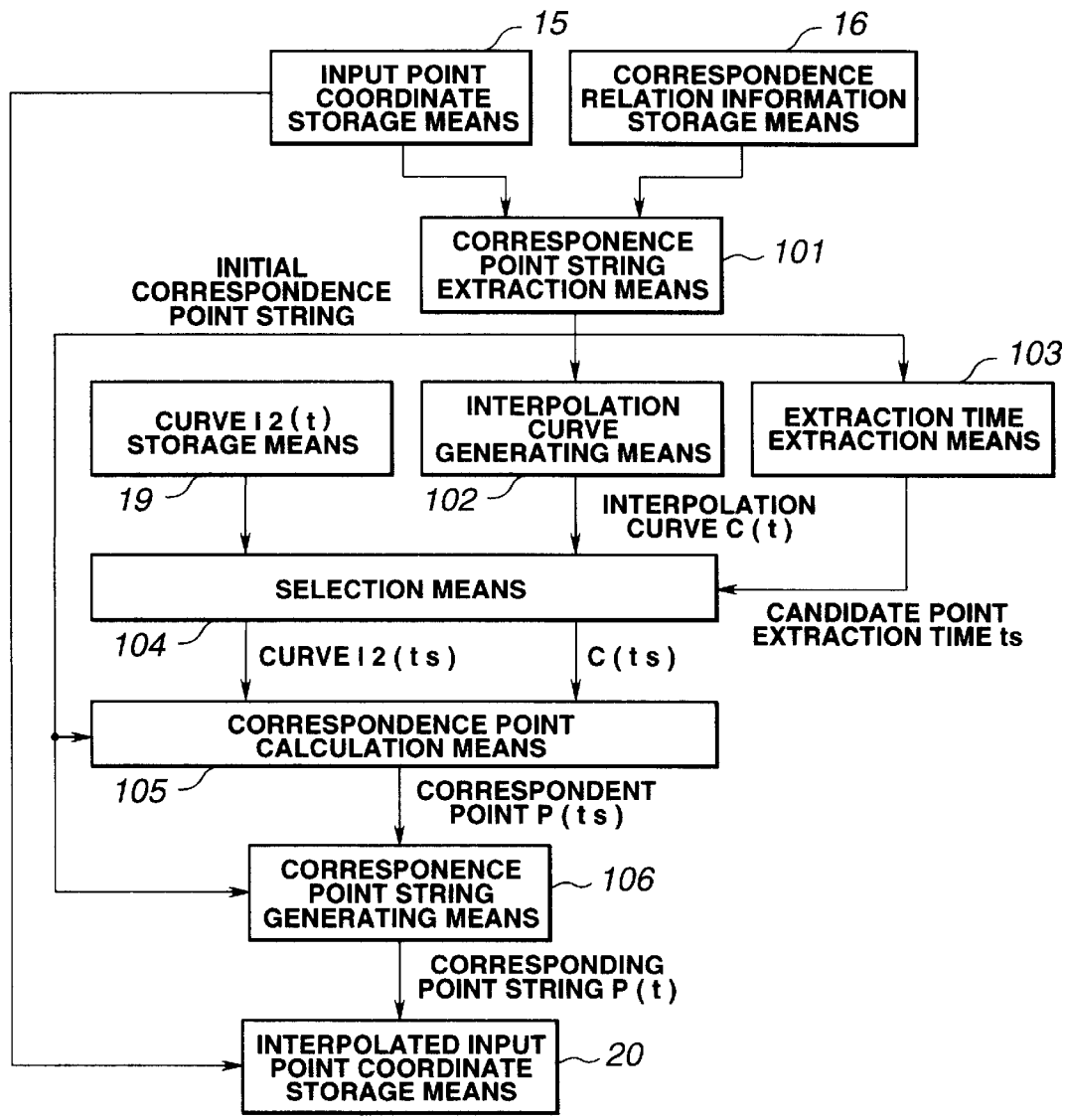
FIG. 1 is a block diagram showing an illustrative structure of essential portions of a time-series data generating device according to the present invention.

Referring to the drawings, preferred embodiments of the present invention will be explained in detail.

First, a time-series data generating device and a time-series data generating method, embodying the present invention, are explained.

FIG. 1 shows a block diagram showing an illustrative structure of essential parts of the time-series data generating device embodying the present invention.

The time-series data generating device is made up of a corresponding point string extracting unit 101, an interpolation curve generating unit 102, an extraction time extracting unit 103, a corresponding point calculating unit 105 and a corresponding point synthesis unit 106. The time-series data generating device is fed with an input point coordinate from an input point coordinate storage unit 15, the corresponding relation information from a corresponding relation information storage unit 16 and a curve I2(t) from a curve storage unit 19 as inputs in order to store processing results, that is interpolated input point coordinate data, in an interpolated input point coordinate storage unit 20. Meanwhile, curve data supplied to the corresponding point calculating unit 105 is selected by a selection unit 104 responsive to a candidate point extraction time juncture ts from the extraction time extracting unit 103.

The method for generating the time-series data according to the present invention will be explained with reference to the illustrative structure of the time-series data generating device of FIG. 1 and to FIG. 2.

Figure 2:
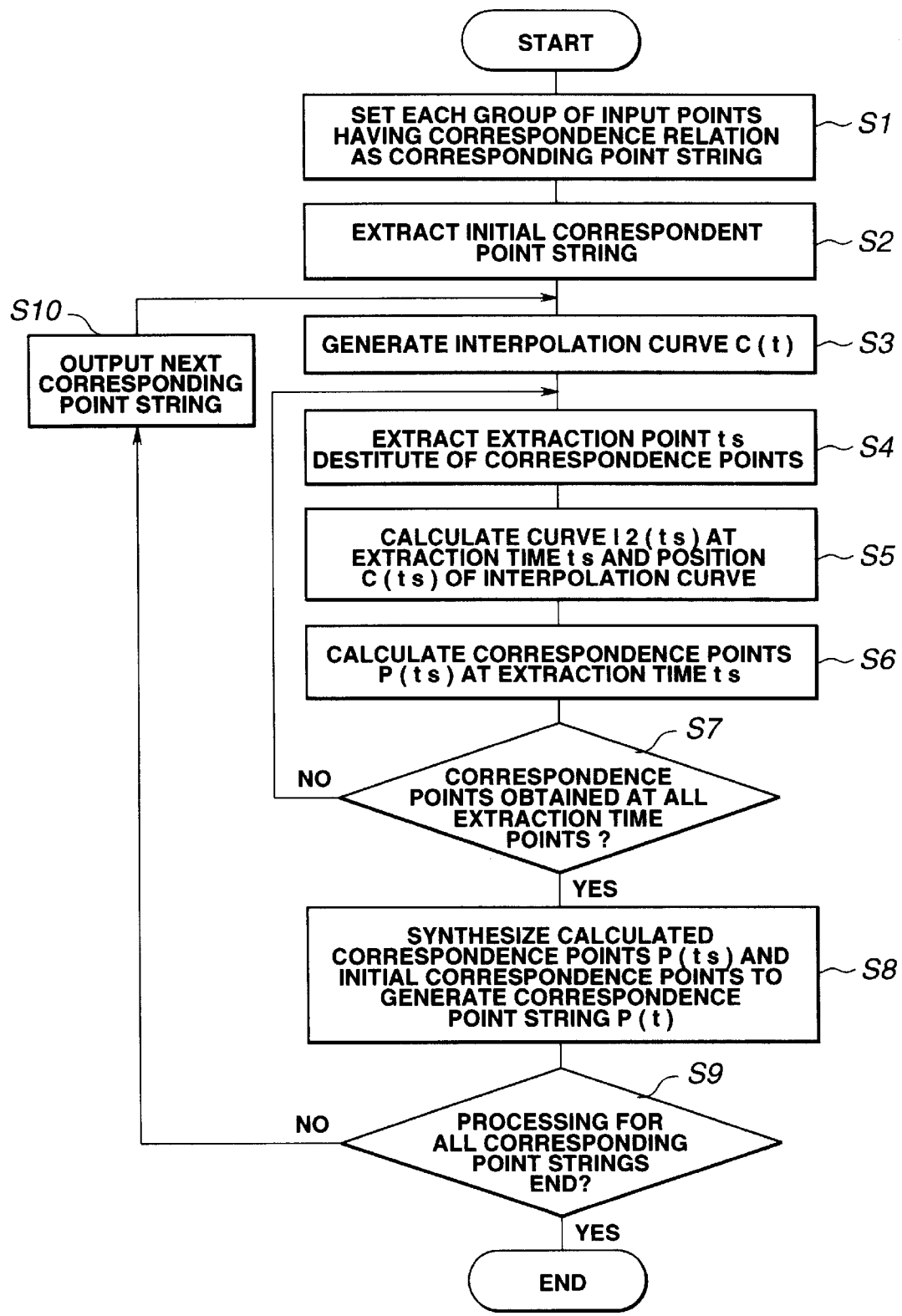
FIG. 2 is a flowchart for illustrating the basic processing sequence of the time-series data generating device according to the present invention.

FIG. 2 shows a flowchart for illustrating the basic processing sequence of the time-series data generating method according to the present invention.

First, at step S1, the corresponding point string extracting unit 101 checks the input point coordinate and the corresponding relation information to set each group of input points having the corresponding relation as a corresponding point string.

Figure 3:
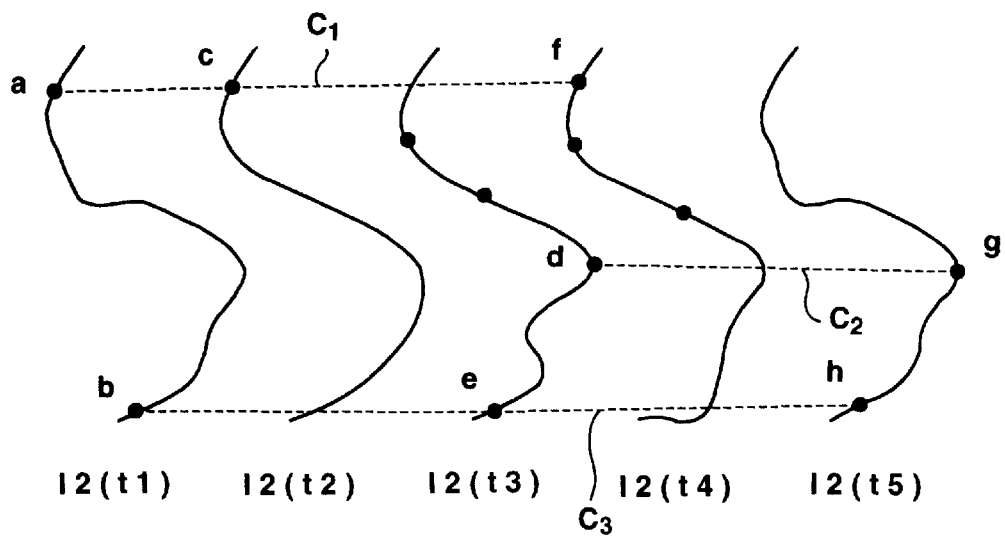
FIG. 3 illustrates the information on the corresponding points and input points before corresponding points interpolation processing.

With reference to the example of FIG. 3, the corresponding relation information is C1, C2 and C3. The corresponding point string for the corresponding relation information C1 is comprised of points a, c and f. Similarly, the corresponding point string C2 is comprised of points d and g, while the corresponding point string C3 is comprised of points b, e and h.

The following processing is executed on these corresponding point strings:

At step S2, the corresponding point string extracting unit 101 outputs the next corresponding point string as an initial corresponding point string.

Then, at step S3, the interpolated curve generating unit 102 calculates an interpolation curve C(t) interpolating the initial corresponding point string along the time axis.

Figure 4:
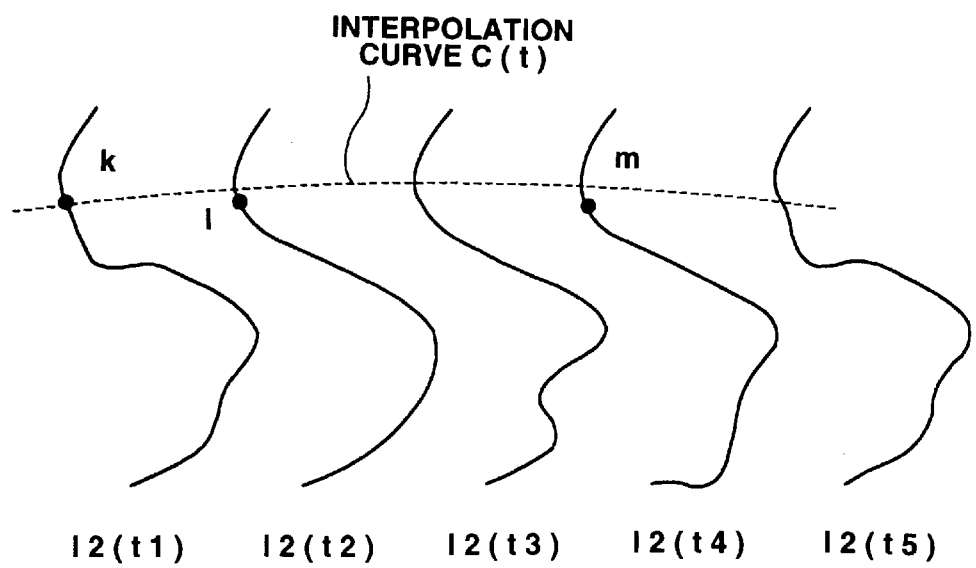
FIG. 4 shows an interpolation curve generated from initial corresponding point string.

FIG. 4 shows an example of an interpolation curve C(t) generated from the initial corresponding point string comprised of three input points (point k, point l and point m). Since the initial corresponding points are obtained on a curve I2(t) at time points t1, t2 and t4, it is necessary to extract candidate points at time points t3 and t5.

Then, at step S4, the extraction time extracting unit 103 checks the initial corresponding point string in order to extract the extraction time point ts for which no corresponding points have as yet not been obtained. If there are plural time junctures for which the corresponding points have not been obtained, these are extracted sequentially one-by-one to execute the following steps S5 and S6:

At step S5, the curve I2(ts) and the passage position C of the interpolated curve (ts) are calculated.

Then, at step S6, the corresponding point calculating unit 105 calculates the corresponding points (ts) at the extracted time point ts from the curve I2(ts) and the passage position C(ts) of the interpolation curve. Meanwhile, the corresponding point calculating unit 105 will be explained in detail subsequently.

At step S7, it is judged whether or not the corresponding points have been obtained at all extraction time junctures. If processing has come to a close at all extraction time junctures, the processing as from step S4 to S6 is repeated.

At step S8, the corresponding points newly calculated at each extraction time juncture are synthesized to the initial corresponding points to calculate a corresponding point string P(t). This corresponding point string P(t) is stored in interpolated input point coordinate storage unit 20.

At step S9, it is judged whether or not the processing for all corresponding point strings has come to a close. If the processing has as not yet been terminated for all corresponding point strings, the processing from step S3 is repeated. On the other hand, if the processing for all corresponding point strings has come to a close for all corresponding point strings, the above-described corresponding point interpolation processing comes to a close.

The corresponding point calculating unit 105 is hereinafter explained.

Figure 5:
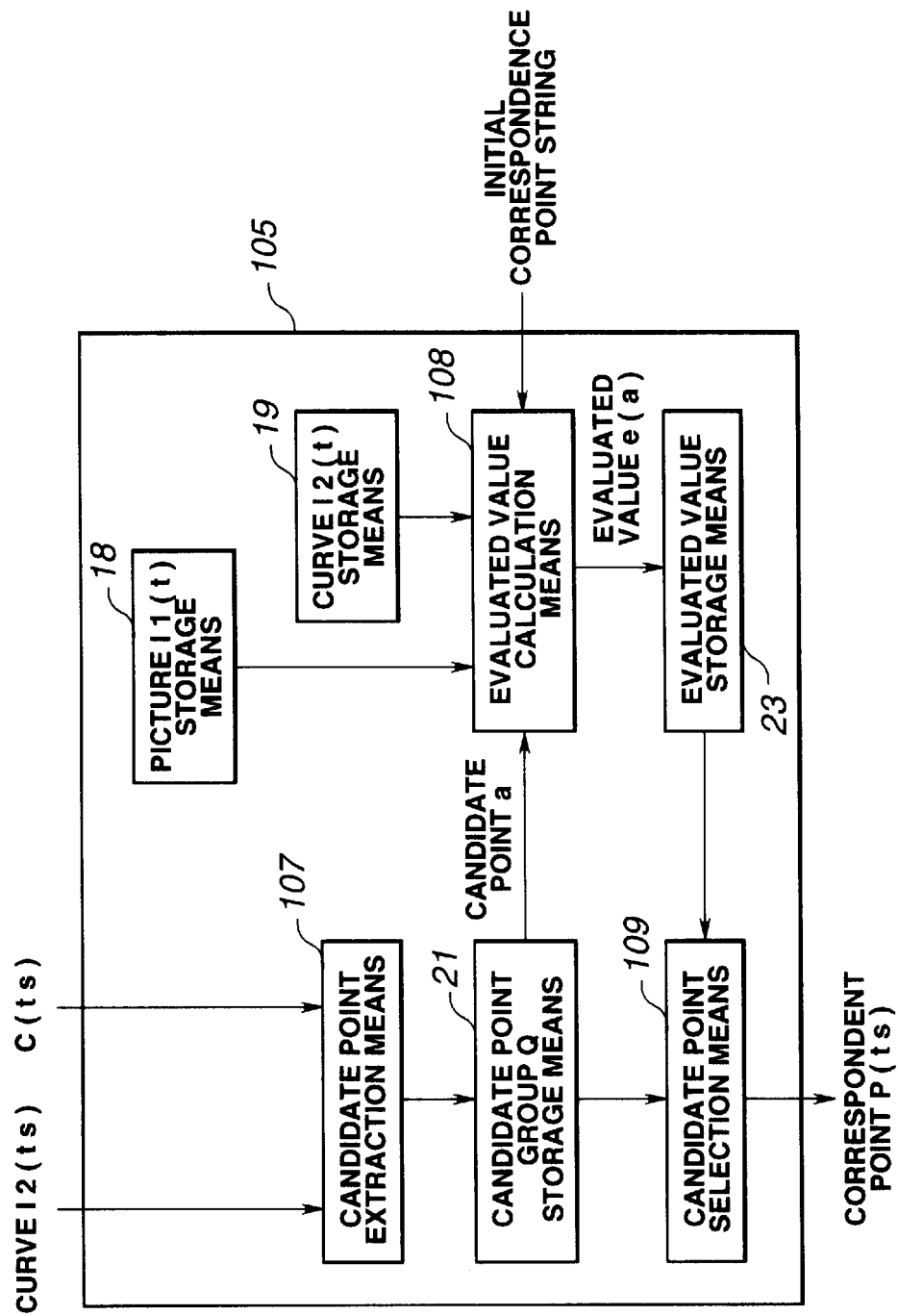
FIG. 5 is a block diagram showing an illustrative structure of corresponding point calculating means.

FIG. 5 shows a block diagram showing an illustrative structure of the corresponding point calculating unit 105.

This corresponding point calculating unit 105 is made up of a candidate point extraction unit 107, an evaluated value calculating unit 108, a candidate point selection unit 109, a candidate point group storage unit 21 and an evaluated value storage unit 23.

The corresponding point calculating unit 105 receives, as inputs, the curve I2(ts) at the extraction point ts as selected by the selection unit 104, the passage position C(ts) of the interpolation curve and the initial corresponding point string, as inputs, in order to output the corresponding points P(ts) at the time juncture ts.

If necessary in executing this processing, the evaluated value calculating unit 108 can refer to the picture I1(t) of all time junctures stored in a picture storage unit 18 and a curve storage unit 19 and to curve I2(t) data.

Figure 6:
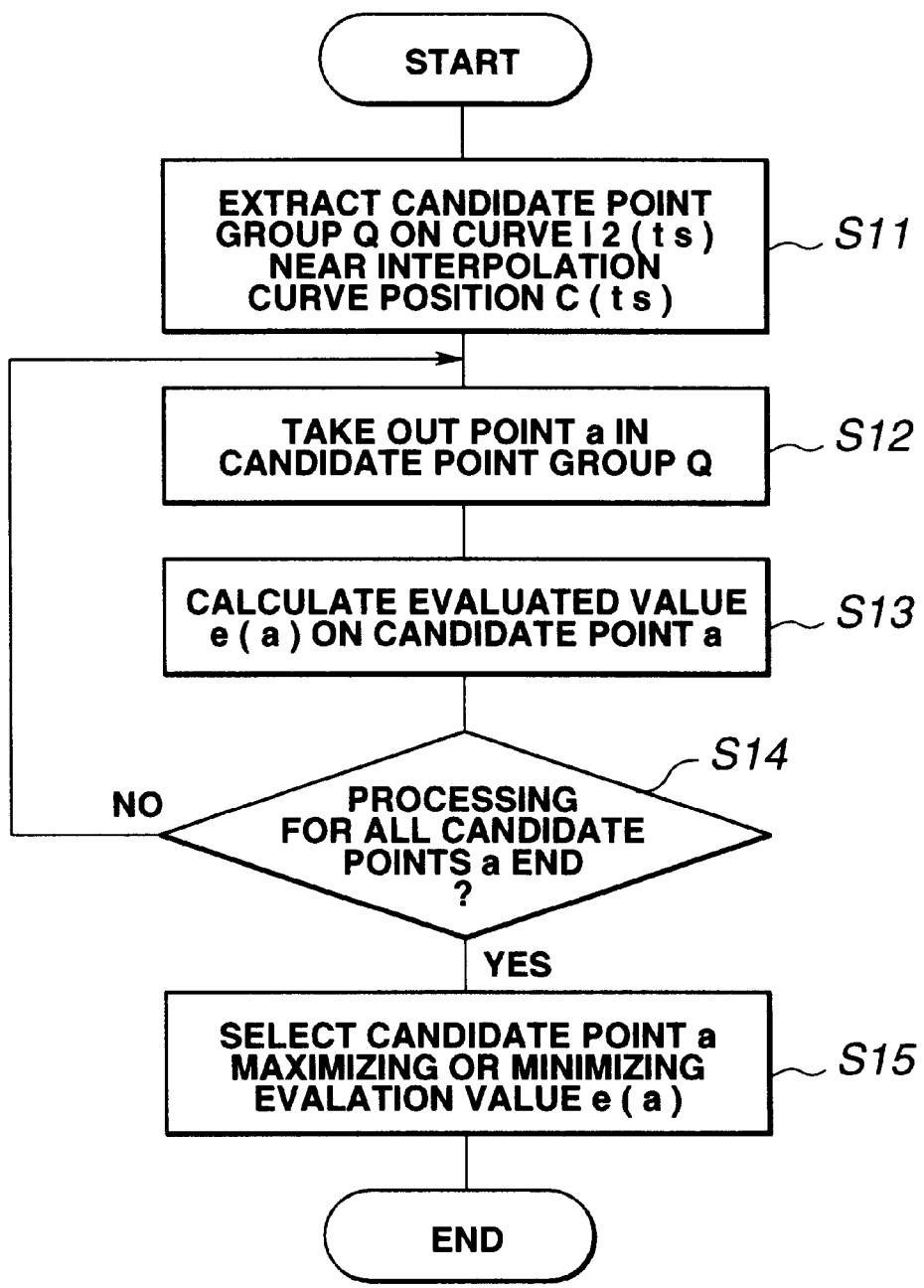
FIG. 6 is a flowchart showing the processing sequence in the corresponding point calculating means.

FIG. 6 shows a flowchart showing the processing sequence at the corresponding point calculating unit 105. The operation of the corresponding point calculating unit 105 is now explained with reference to FIGS. 5 and 6.

First, at step S11, the candidate point extraction unit 107 extracts plural candidate points on the curve 12(ts) from the neighbor area of the passage point C(ts) of the interpolation curve in order to store the extracted candidate points in the candidate point group storage unit 21.

Figure 7:
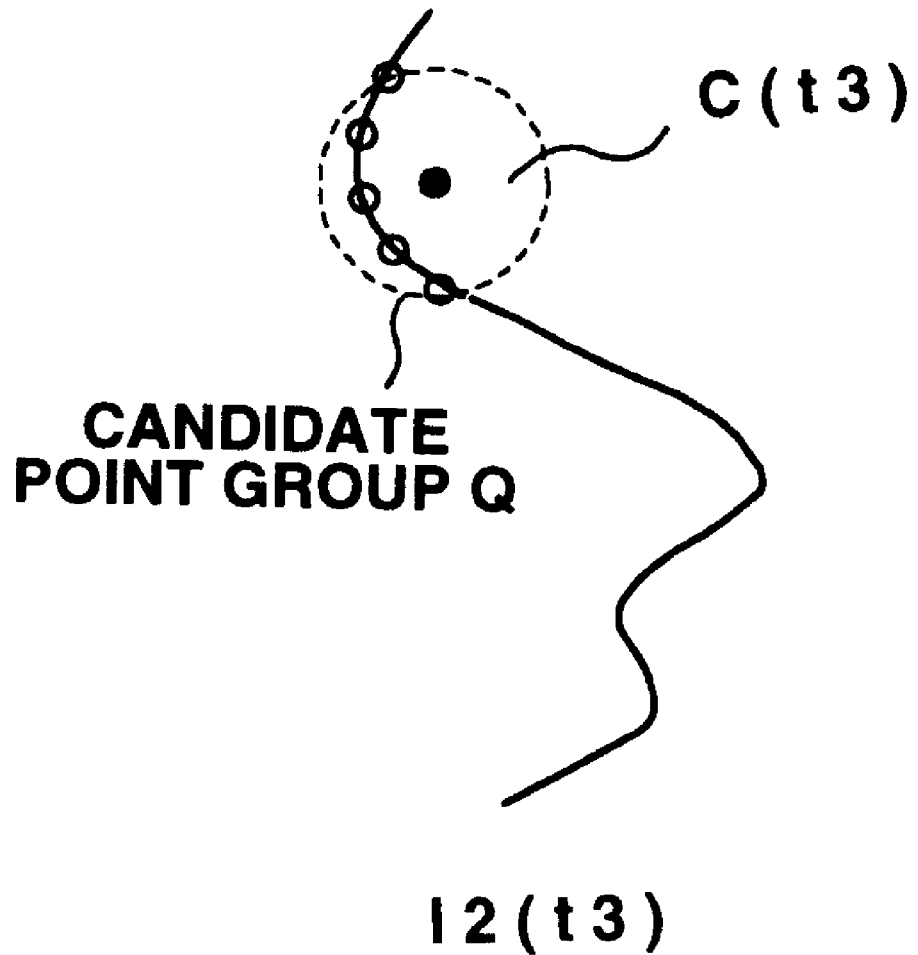
FIG. 7 illustrates candidate point extracting processing.

FIG. 7 shows the state of candidate point extraction at the extraction time juncture t3 for which the corresponding points have as yet not been obtained. Then, from the passage point C(t3) of the interpolation curve at time t3, points on the curve I2(t3) present in a pre-set range are extracted as candidate points.

Then, at step S12, a point q is taken out from the candidate point group.

Then, at step S13, the evaluated value calculating unit 108 calculates the evaluated value e(q) on the candidate point q thus taken out to store the evaluated value data in the evaluated value storage unit 23. The evaluated value calculating unit 108 will be discussed subsequently in detail.

At step S14, it is judged whether or not processing on the totality of candidate points q has come to a close. If the processing on all of the candidate points q has not come to a close, the processing of steps S12 and S13 is repeated. Conversely, if the processing on all of the candidate points q has come to a close, processing transfers to step S15.

At step S15, the candidate point selection unit 109 selects a candidate point q which maximizes or minimizes the evaluation values from the group of candidate points Q to set it as a corresponding point P(ts). It depends on the calculating method used whether the evaluation value is the maximum or minimum, so that it is pre-set.

After processing at step S15 comes to a close, the above processing is terminated.

The evaluated value calculating unit 108 is hereinafter explained.

Figure 8:
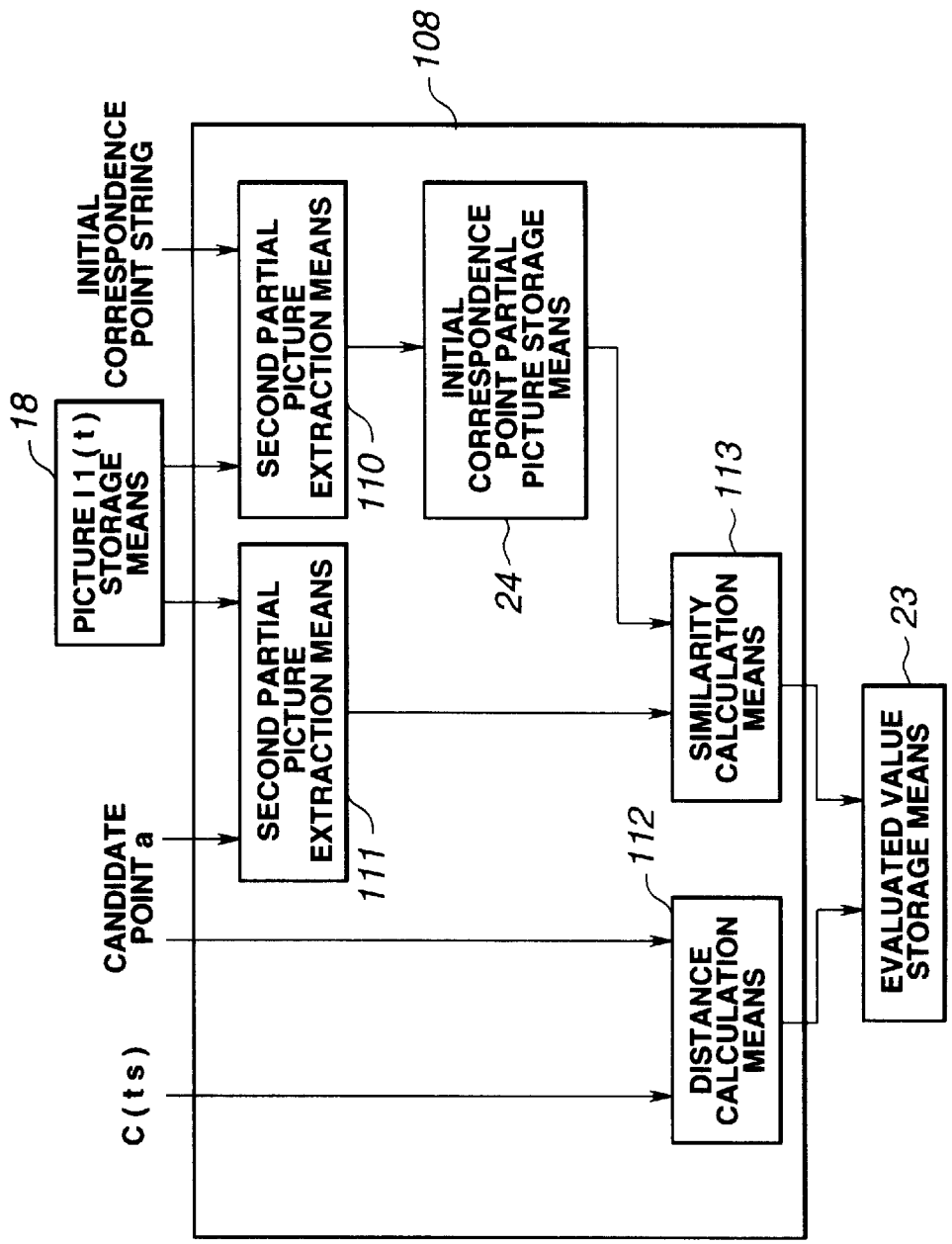
FIG. 8 is a block diagram showing an illustrative structure of evaluated value calculation means.

FIG. 8 shows a block diagram of an illustrative structure of the evaluated value calculating unit 108.

The evaluated value calculating unit 108 receives the candidate point q, passage point C(ts) of an interpolation curve, a picture I1(ts) and an initial corresponding point string as inputs to output a evaluated value at the candidate point q, and is made up of a distance calculating unit 112, a first partial picture extraction unit 110, a second partial picture extraction unit 111, a similarity calculating unit 113 and an initial candidate points partial picture storage unit 24 for storing initial candidate points partial picture data.

Figure 9:
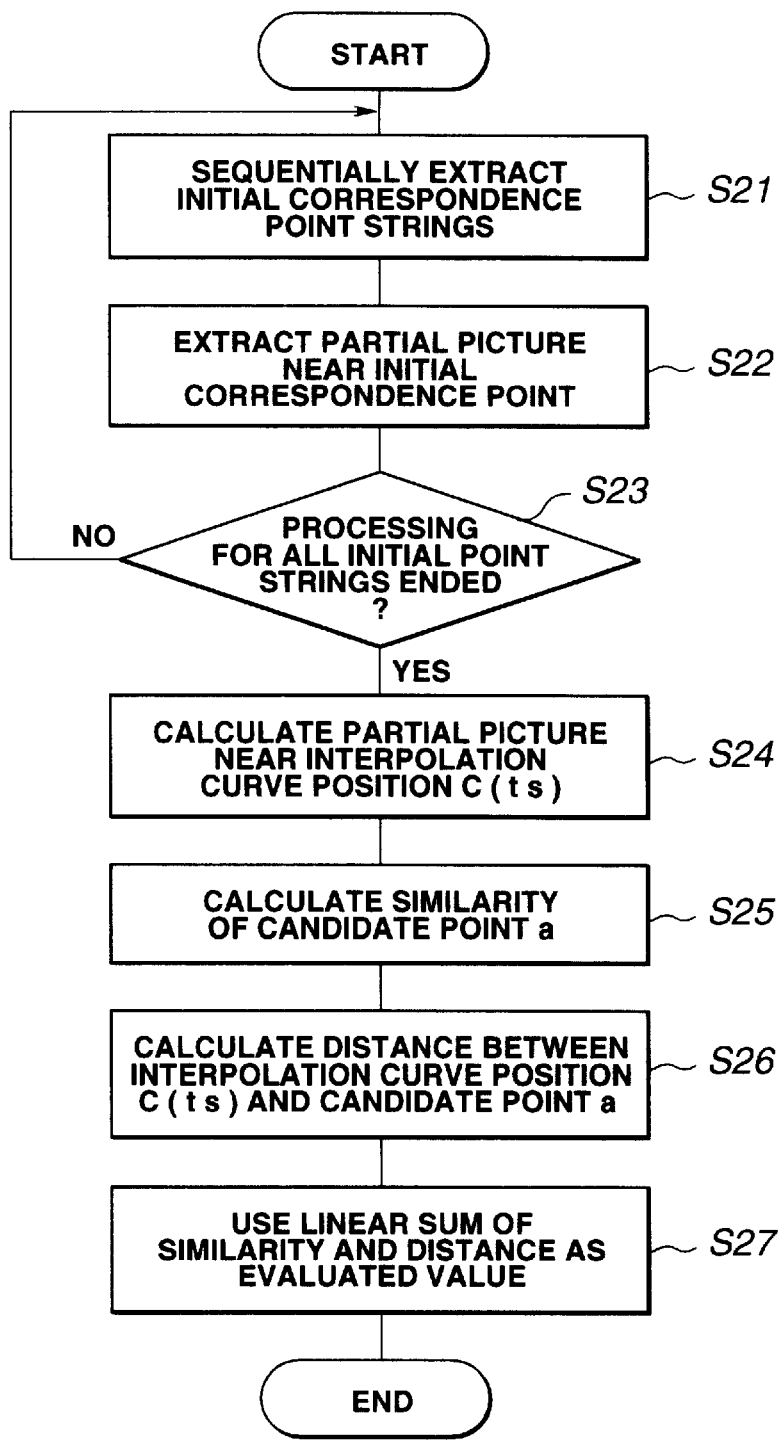
FIG. 9 is a flowchart for illustrating the processing sequence by the evaluated value calculation means.

FIG. 9 shows a flowchart illustrating the processing sequence in the evaluated value calculating unit 108. Referring to FIGS. 8 and 9, the operation of the evaluated value calculating unit 108 is explained.

First, at step S21, the initial corresponding points in the initial corresponding point string are sequentially extracted.

Then, at step S22, the first partial picture extraction unit 110 extracts a partial picture of a predetermined size in the vicinity of the initial corresponding point extracted at step S11 to store the extracted partial picture in the initial candidate points partial picture storage unit 24.

It is judged at step S23 whether or not processing has come to a close at all initial corresponding points. If the processing for all initial corresponding points has come to a close, processing transfers to step S24. If the processing for all initial corresponding points has not come to a close, processing reverts to step S21 to repeat the processing.

At step S24, the second partial picture extraction unit 111 extracts a partial picture of the same shape as that extracted at step S22 in the vicinity of the candidate point q.

Then, at step S25, the similarity calculating unit 113 calculates similarity of the candidate point q from the partial pictures obtained at steps S22 and S23.

If the ith initial corresponding point partial picture is Iri and a partial picture of the candidate point q is Iq, the similarity s(q) at the candidate point q is found from the following equation (1):

$$s(q) = \min \{error(Iri, Iq)\} \quad (1)$$

where error (a,b) is the magnitude of an error between pictures a and b and min { } represents calculations which select the minimum error (Iri, Iq) in all error (Iri, Iq) with i.

Then, at step S26, the distance calculating unit 112 calculates the distance d(q) between the passage position C(ts) of the interpolation curve and the candidate point q.

Then, at step S27, the evaluation value e(q) at the candidate point q is found as a linear sum of the similarity s(q) and the distance d(q) represented by the following equation (2):

$$e(q) = w1*s(q) + w2*d(q) \quad (2)$$

where w1 and w2 denote weighting coefficients.

The evaluated value data is stored in the evaluated value storage unit 23 to terminate the above processing.

Another illustrative structure of a time-series generating device according to the present invention, referred to hereinafter as second time-series generating device, is explained.

In the following description, parts or components common to the above-described time-series generating device are denoted by the same reference numerals.

Figure 10:
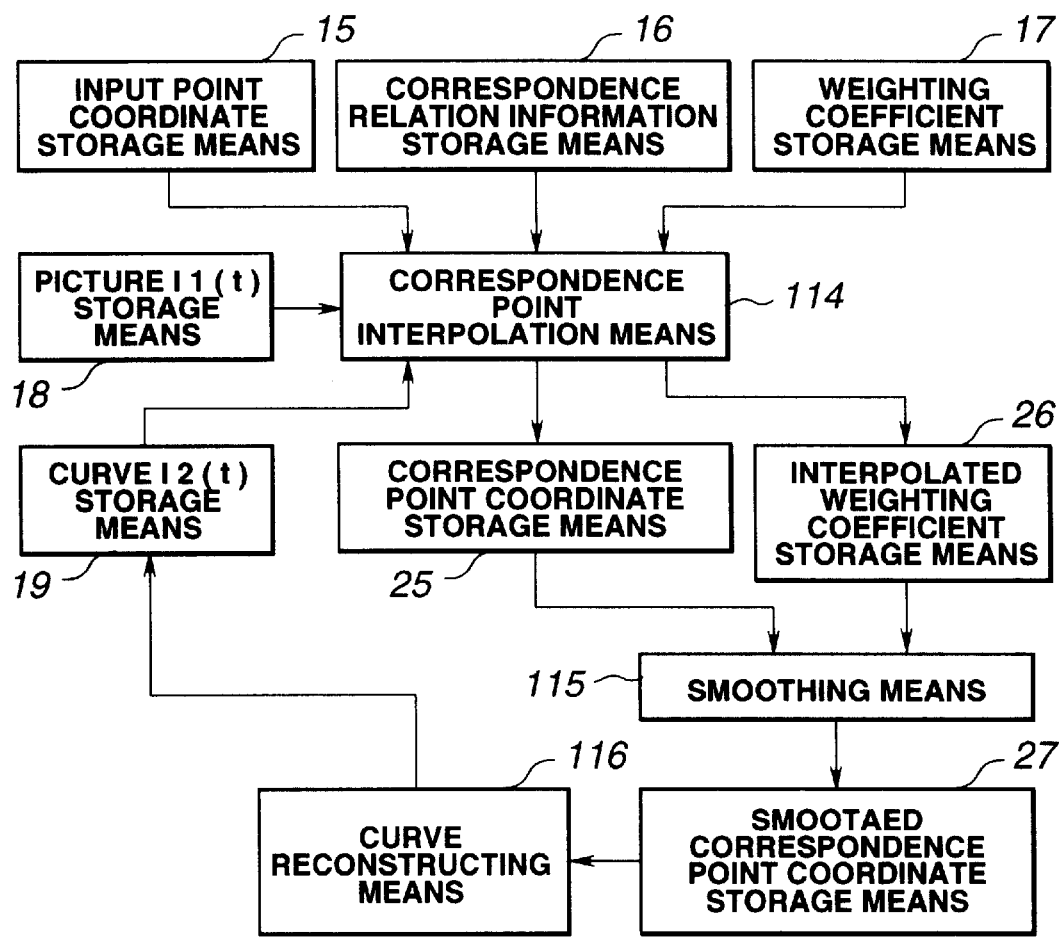
FIG. 10 is a block diagram showing an illustrative structure of a second time-series data generating device according to the present invention.

FIG. 10 is a block diagram showing an illustrative structure of the second time-series generating device according to the present invention.

Similarly to the above-described time-series generating device according to the present invention, the second time-series generating device receives input point coordinate points from an input point coordinate storage unit 15, corresponding point information of the input points from the corresponding relation information storage unit 16, input point weighting coefficients from the weighting coefficient storage unit 17, a picture I1(t) from the picture storage unit 18 and a curve I2(t) from the curve storage unit 19 as inputs and deforms the curve I2(t) to remove its fluctuations to update data of the curve I2(t) stored in the curve storage unit 19.

The second time-series data generating device is made up of a corresponding point interpolation unit 114, a smoothing unit 115, a curve re-constructing unit 116, a corresponding point coordinate storage unit 25, an interpolated weighting coefficient storage unit 26 and a smoothed corresponding point coordinate storage unit 27.

Referring to an illustrative structure of the second time-series data generating device and to FIG. 11, another time-series data generating method (referred to hereinafter as a second time-series data generating method) will be explained.

Figure 11:
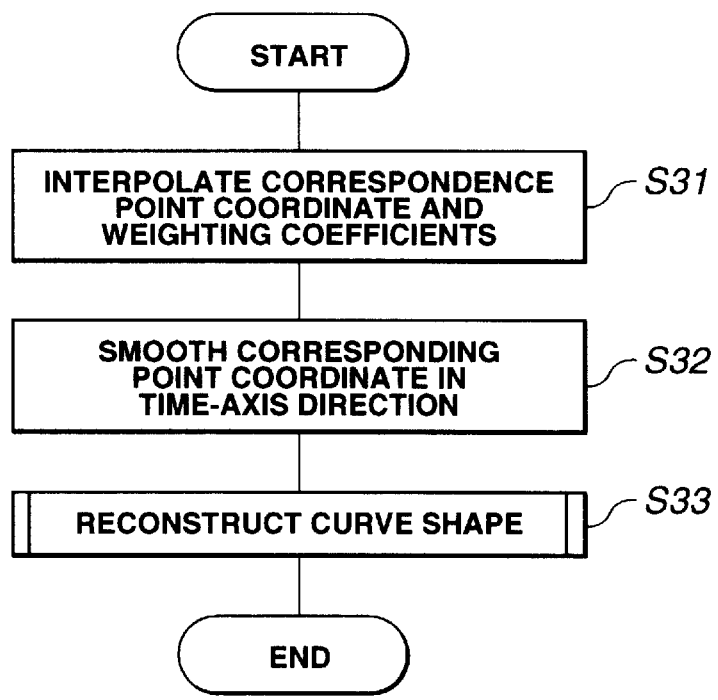
FIG. 11 is a flowchart showing the basic processing sequence a second time-series data generating method according to the present invention.

FIG. 11 is a flowchart showing the basic processing sequence of the second time-series data generating method according to the present invention.

First, at step S31, the corresponding point interpolation unit 114 receives, as inputs, the input point coordinate, corresponding relation information, weighting coefficients, picture I1(t) and the curve I2(t), interpolates a number of corresponding points as required for deforming a curve and stores corresponding points coordinate data in the corresponding points coordinate storage unit 25. The weighting coefficient values of the interpolated corresponding points are also interpolated from the weighting coefficient values of the input points and stored in the interpolated weighting coefficient storage unit 26.

Then, at step S32, the smoothing unit 115 smooths the candidate points along time axis, by weighted smoothing, based on the corresponding point coordinates and interpolated weighting coefficients, to store the smoothed candidate points in the smoothed candidate point coordinate storage unit 27.

Then, at step S33, the curve re-constructing unit 116 re-constructs a curve at each time point, from the smoothed corresponding point coordinate, in order to store the resulting curve data I2(t) in the curve storage unit 19.

The above sequence of operations completes the processing.

The corresponding point interpolation unit 114 is explained in detail.

Figure 12:
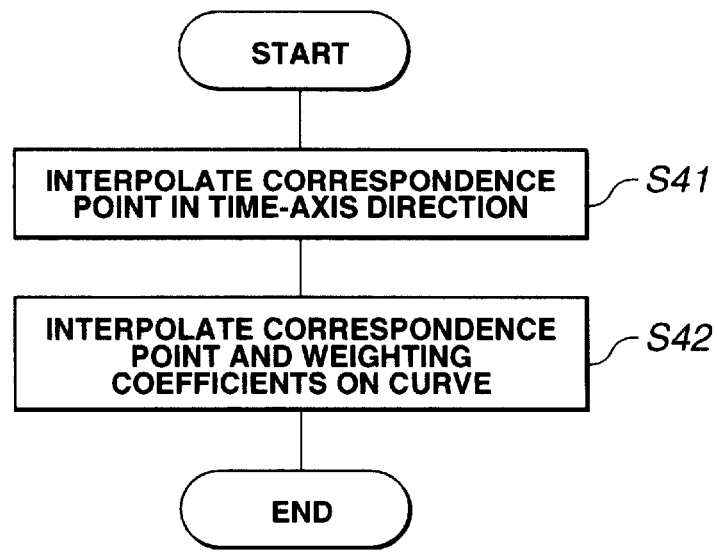
FIG. 12 is a flowchart showing the processing sequence by corresponding points interpolation means.

FIG. 12 shows a flowchart showing the processing sequence in the corresponding point interpolation unit 114.

First, at step S41, corresponding points are interpolated along the time axis.

Then, at step S42, corresponding points and the weighting coefficients are interpolated on the curve to complete the above processing.

Thus, the interpolation processing in the corresponding point interpolation unit 114 is the two-stage processing comprised of interpolation of corresponding points and the weighting coefficients.

Before proceeding to description of the structure of the corresponding point interpolation unit 114, the above-described two-stage processing is explained.

Figure 13:
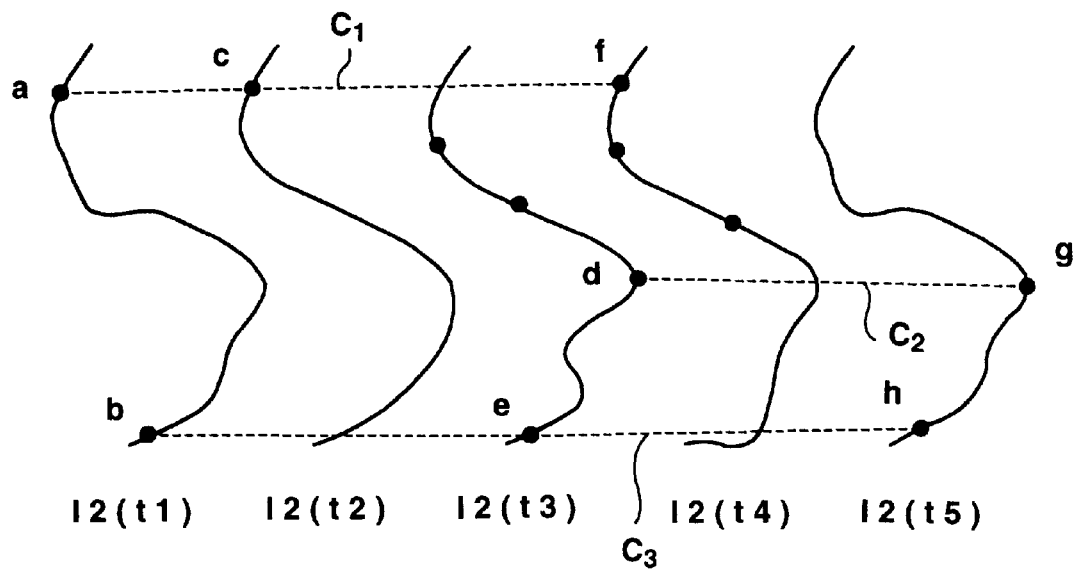
FIG. 13 illustrates an example of the information on the input point and the corresponding relation prior to corresponding points interpolation processing.

FIG. 13 shows an example of the input points and the corresponding relation information prior to corresponding point interpolation.

In this figure, the curves I2(t) are time-series data comprised of curves at five time junctures t1 to t5. In the curves I2(t), a sum total of 12 input points indicated by black dots are set. Of these, the input points a to h are associated with one another by the corresponding relation C1, C2 and C3, indicated by broken lines.

However, corresponding points are not afforded to the corresponding relation information C1 at time junctures t3 and t5. On the curves at time junctures t3, t4, there are also input points for which there is afforded no corresponding relation.

For the given intervals between the input points, it cannot be said that the corresponding relation is realized in all positions on the curve, such that the corresponding points of finer intervals are required for a smoothing operation.

Thus, the corresponding point interpolation is the processing of interpolating a required number of corresponding points on the curve to enable smoothing.

Figure 14:
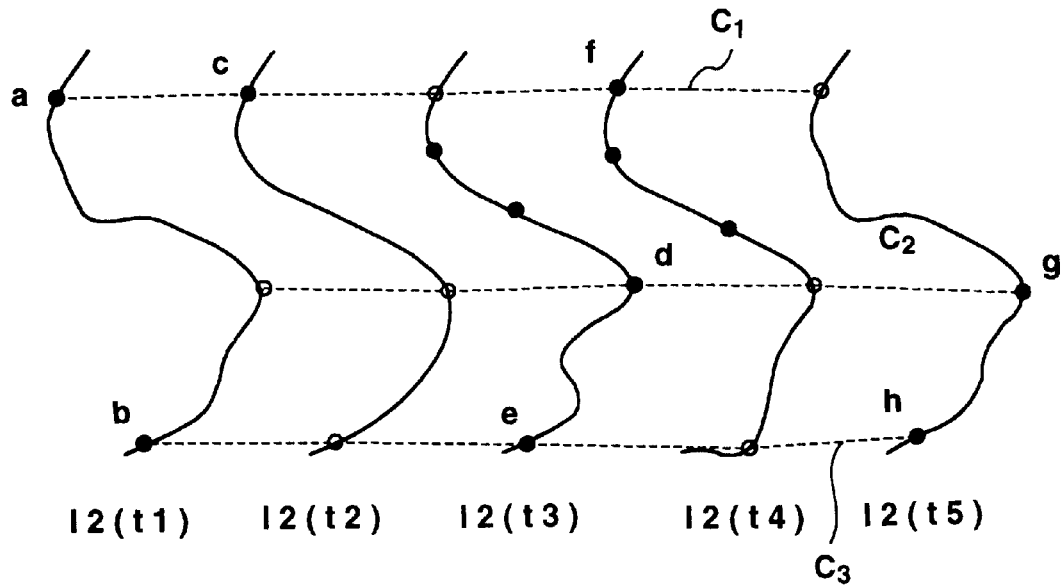
FIG. 14 illustrates an example of the results of first corresponding point interpolation processing in the time-axis direction.

FIG. 14 shows the results of interpolation of corresponding points on the curve I2(t) in the time-axis direction (first candidate point interpolation).

This first interpolation of corresponding points is the processing of interpolating corresponding points for time junctures for which corresponding points are not obtained for input points to which is accorded the cross-sectional information. That is, in FIG. 13, since the three items of the corresponding relation information C1, C2 and C3 is given, the information is expanded to the totality of time junctures to interpolate the corresponding points indicated by white circles. This first corresponding point interpolation may be carried out by the above-described time-series data generating method of the present invention.

The processing of interpolating the corresponding point weighting coefficients on the curve at each time juncture (second corresponding point interpolation) is explained.

FIG. 15 shows the manner of second corresponding point interpolation on each curve of the curves I2(t) of FIG. 13.

Figure 15A:
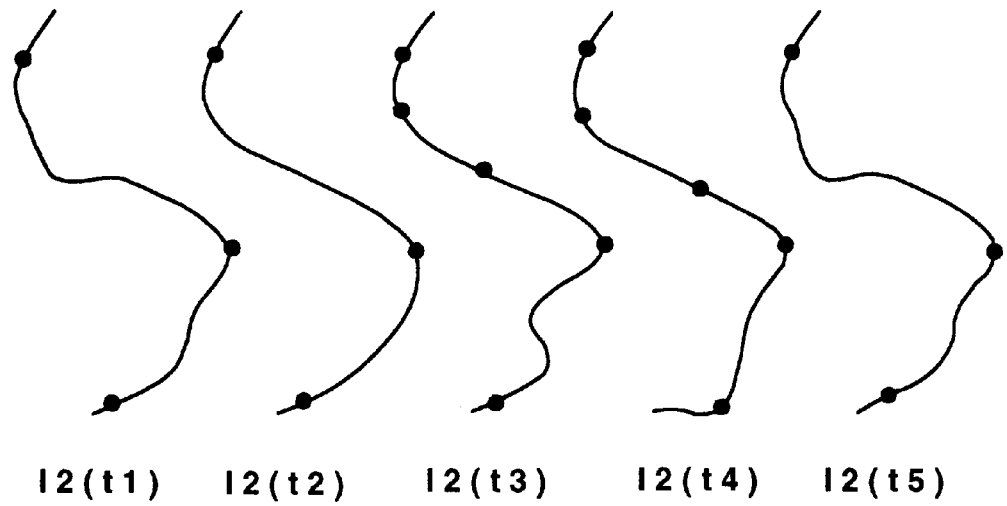
FIGS. 15A, 15B illustrate second corresponding point interpolation processing on a curve.

FIG. 15A shows the state in which the first corresponding point interpolation has come to a close. In this state, the corresponding points indicated by black dots at each time juncture are rather sparse.

Figure 15B:
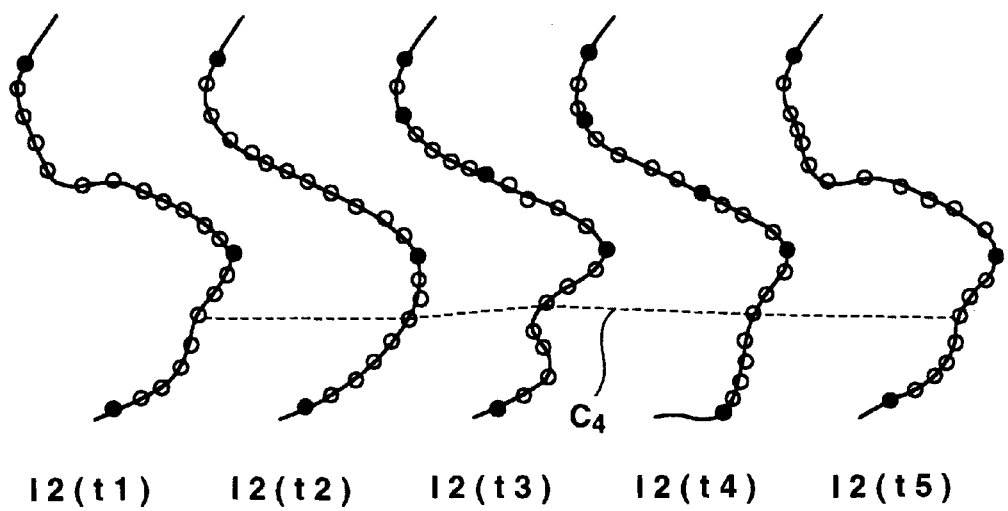

Thus, as shown in FIG. 15B, the second corresponding point interpolation is performed so that corresponding points will be present in sufficient densities on the curves. In this second interpolation processing, the addition corresponding points are added so as to have the corresponding relation at each time juncture.

In the second interpolation, weighting coefficients of the interpolated corresponding points are calculated simultaneously with interpolation of the corresponding points.

Figure 16A:
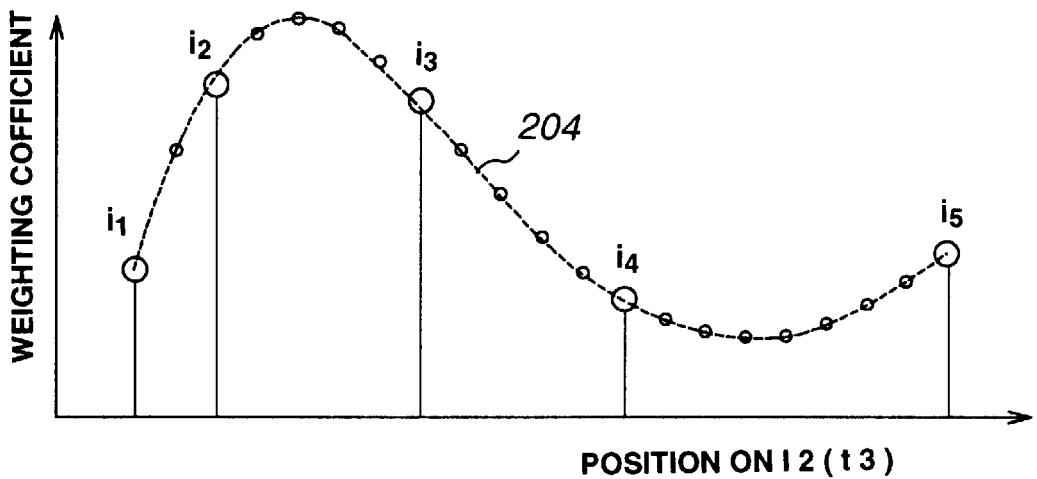
FIGS. 16A, 16B illustrate weighting coefficient interpolation calculations in the second interpolation processing.

FIG. 16A shows the weighting coefficients of input points on the curve I2(t3) of FIG. 15A. There are five points and on the curve I2(t) for each of which a weighting coefficient value is set. A broken line 204 is an interpolation function of weighting coefficients on the curve calculated on the basis of these weighting coefficients.

Figure 16B:
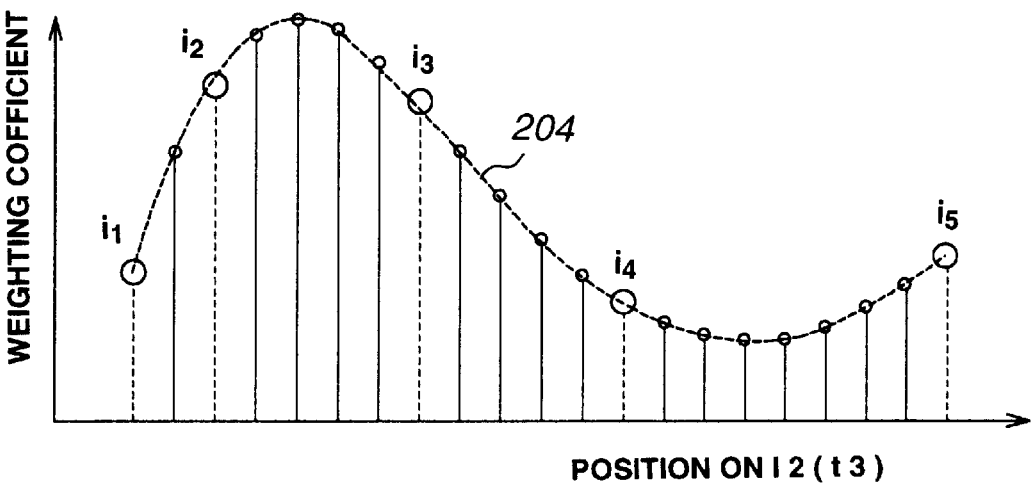

FIG. 16B shows weighting coefficient values on the curve I2(t3) obtained on interpolation of candidate points from FIG. 15B.

Thus, the weighting coefficients of the corresponding points, added by the interpolation of corresponding points, are calculated from the interpolation function of the weighting coefficients, and set on the corresponding points.

The structure of the corresponding point interpolation unit 114 is explained.

The corresponding point interpolation unit 114 is made up of a portion doing interpolation corresponding point interpolation and a portion doing second corresponding point interpolation.

The first corresponding point interpolation portion can make use of the above-described time-series data generating device of the present invention described previously. In the following, description is made of the second corresponding point interpolation portion doing candidate point interpolation on the curve.

Figure 17:
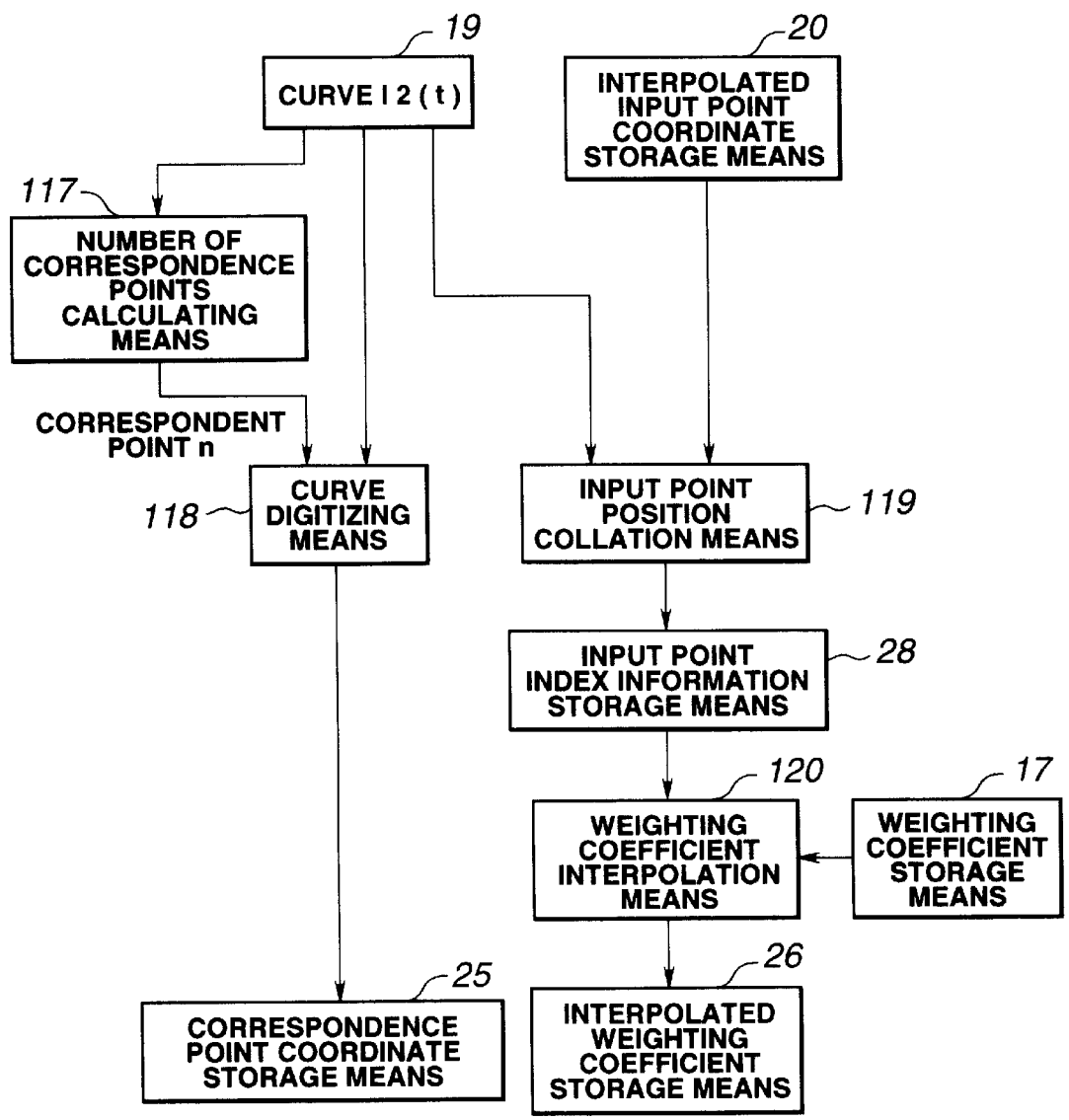
FIG. 17 is a block diagram showing an illustrative structure of a second corresponding point interpolation unit.

FIG. 17 shows a block diagram of an illustrative structure of the second candidate point interpolation unit of the corresponding point interpolation unit 114.

This second corresponding point interpolation portion 114 receives the time-series curve I2(t) from the curve storage unit 19, weighting coefficients from the weighting coefficient storage unit 17 and the interpolated input point coordinates from the interpolated input point coordinate storage unit 20, as found by the first corresponding point interpolation, to output the processed results to the interpolated weighting coefficient storage unit 26 and to the corresponding points coordinate storage unit 25.

This second corresponding point interpolation portion is made up of a corresponding point calculation unit 117, a curve digitizing unit 118, an input point position collation unit 119, a weighting coefficient interpolation unit 120 and an index information storage unit 28 for storage of index information data of input points.

Figure 18:
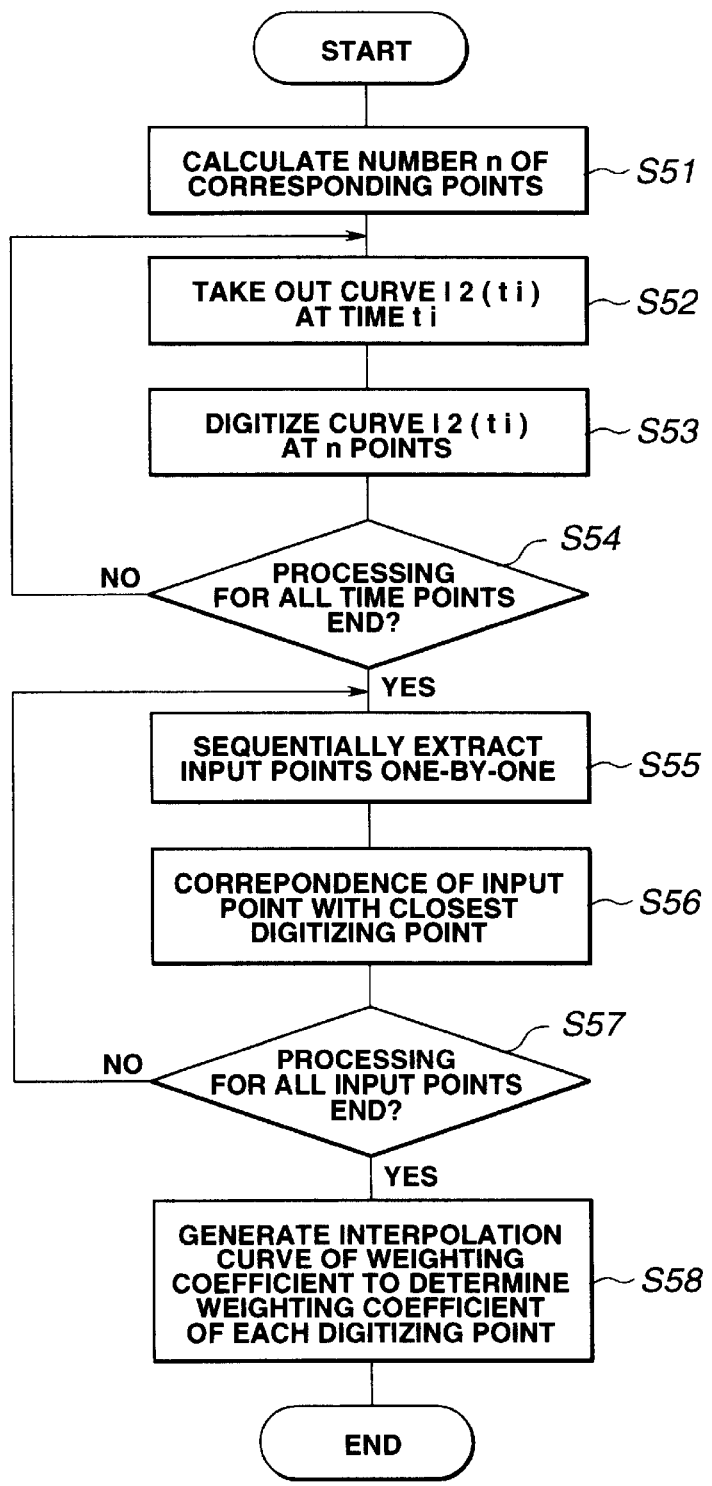
FIG. 18 is a flowchart for illustrating the processing sequence in the second corresponding point interpolation unit.

FIG. 18 shows a flowchart illustrating the processing sequence by the second candidate point interpolation portion of the corresponding point interpolation unit 114. Referring to FIG. 17 and 18, the operation of the second corresponding point interpolation portion is explained.

First, at step S51, the corresponding point calculation unit 117 checks the length of the curve I2(t) at all time junctures, in order to calculate the number n of the corresponding points required per curve. Here, the number is calculated to allow approximation by polygonal lines by n corresponding points for whichever time juncture curve.

Then, at step S52, the curve I2(t) is taken out at each time ti.

Then, at step S53, the curve digitizing unit 118 digitizes the curve I2(ts) at time ti at points of the number n of the number of corresponding points. If processing is not terminated for each time juncture, processing reverts to step S52 to repeat the above-described processing.

At step S55, the interpolated points from the input point coordinate storage unit 20 are extracted one-by-one.

At step S56, the input point position collation unit 119 selects, from the digitized points obtained at step S53, a point closest to the extracted input point, and stores in the index information storage unit 28 the index information specifying which of the n points the selected point is as counted from the first one in the index information storage unit 28 for the index points. The input points are associated with the nearest digitizing point.

At step S57, it is judged whether processing for all input points has come to a close. If processing for all input points has not come to a close, processing reverts to step to repeat the above processing.

At step S58, the weighting coefficient interpolation unit 120 calculates the interpolation curve of the weighting coefficient on the curves of the respective time junctures, using the weighting coefficient values at the respective input points and the index information at each input point obtained at step S56, in order to determine the weighting coefficients of all the corresponding points.

The calculated weighting coefficient values are stored in the weighting coefficient storage unit 26 to terminate the processing at the second corresponding points interpolating portion.

The curve re-constructing unit 116 are the smoothing unit 115 is explained in detail.

Figure 19:
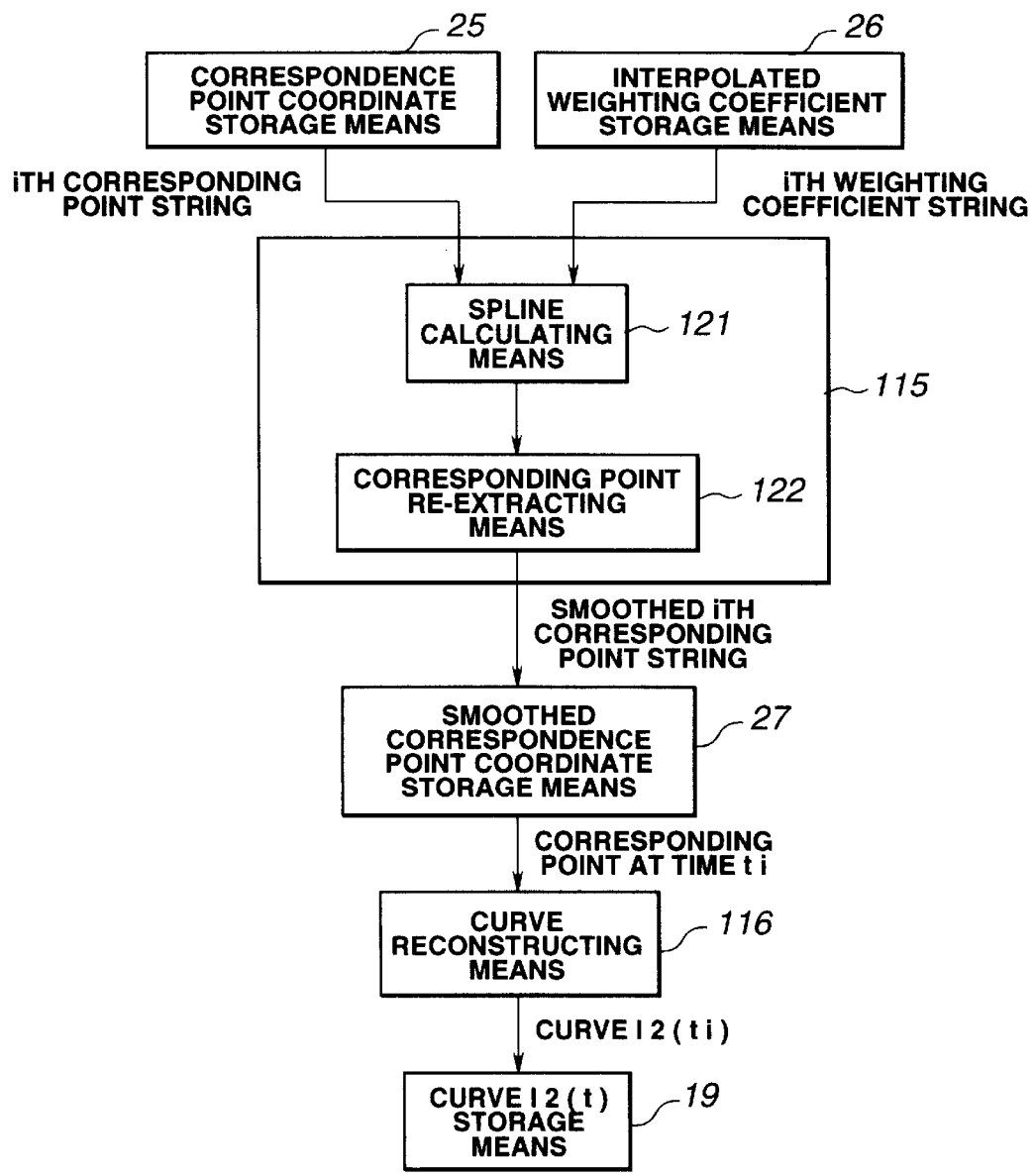
FIG. 19 is a block diagram showing an illustrative structure of smoothing means and curve reconstructing means of the second time-series data generating means.

FIG. 19 shows a block diagram showing the smoothing unit 115 and the curve re-constructing unit 116 of the second time-series data generating device. The smoothing unit 115 is shown divided further into a spline calculating unit 121 and a corresponding point re-extracting unit 122.

Figure 20:
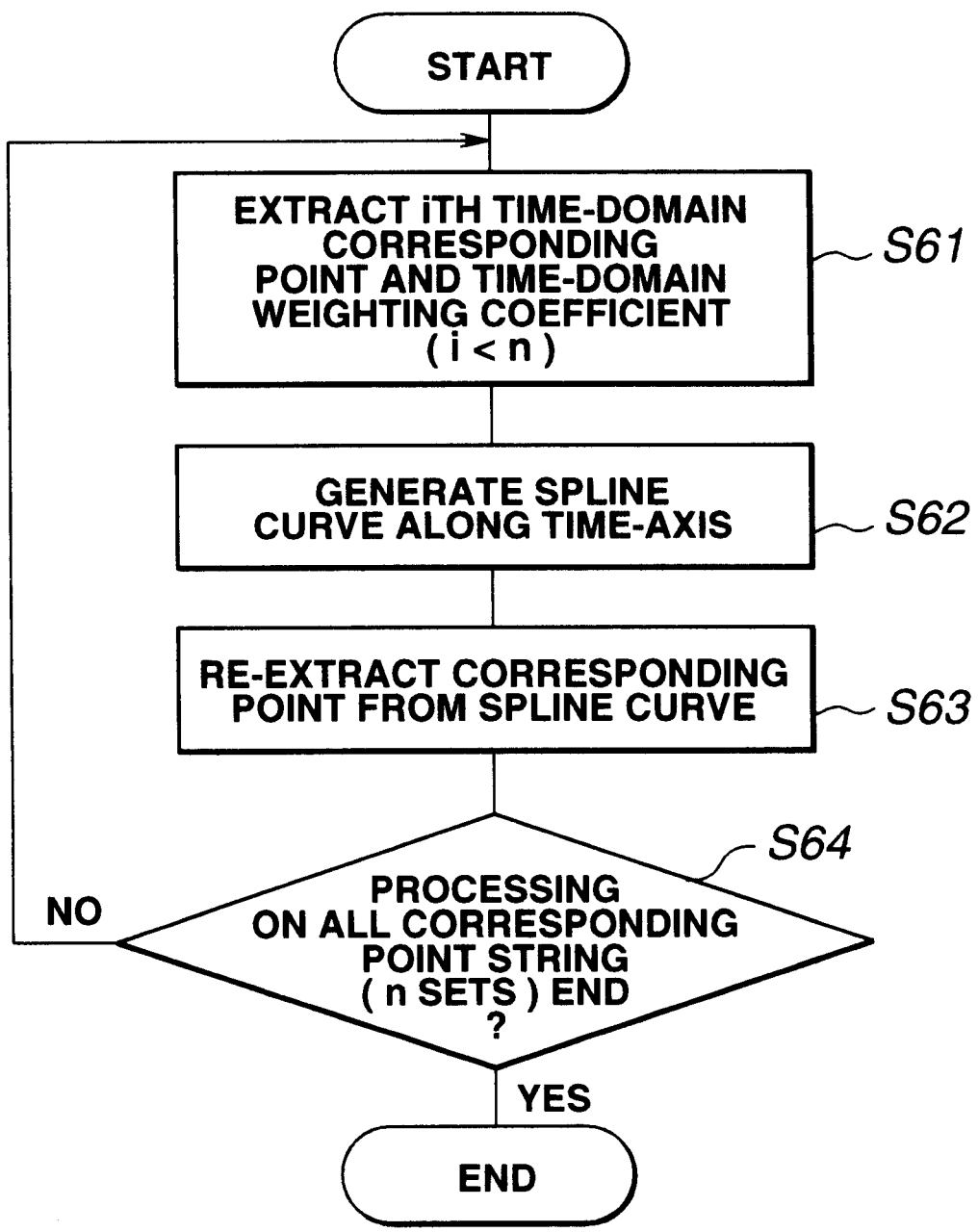
FIG. 20 is a flowchart showing the processing sequence by the smoothing means.

FIG. 20 shows the processing sequence in the smoothing unit 115.

Referring to FIGS. 19 and 20, the operation of the smoothing unit 115 is explained.

First, at step S61, the ith corresponding point time sequence and the weighting coefficient time sequence from the n corresponding points and n weighting coefficient obtained at each time juncture.

Then, at step S62, the spline calculating unit 121 generates a weighted spline curve smoothing the corresponding point string in the time axis direction from the corresponding point string and the weighting coefficient string obtained at step S61.

The weighting spline curve is based on a β-spline curve as described in Foly, vanDam, Feiner and Hughes, 'computer graphics principles and practice', Addison Wesley, has its shape determined by adjusting bias parameters controlling the shape of the β-spline by the weighting coefficients at respective candidate points.

Then, at step S63, the corresponding point re-extracting unit 122 corrects the corresponding point positions at each time juncture based on the produced spline curve. That is, the passage position of the spline curve is calculated at each time juncture and used as a new corresponding point position.

At step S64, it is judged whether or not processing for all corresponding point strings (n sets) has come to a close. If processing has not come to a close for all corresponding point strings, processing reverts to step S61 to repeat the above processing. Conversely, if processing has come to a close for all corresponding point strings, the above smoothing processing is terminated.

FIG. 21 shows how one of n corresponding point strings is smoothed.

Figure 21A:
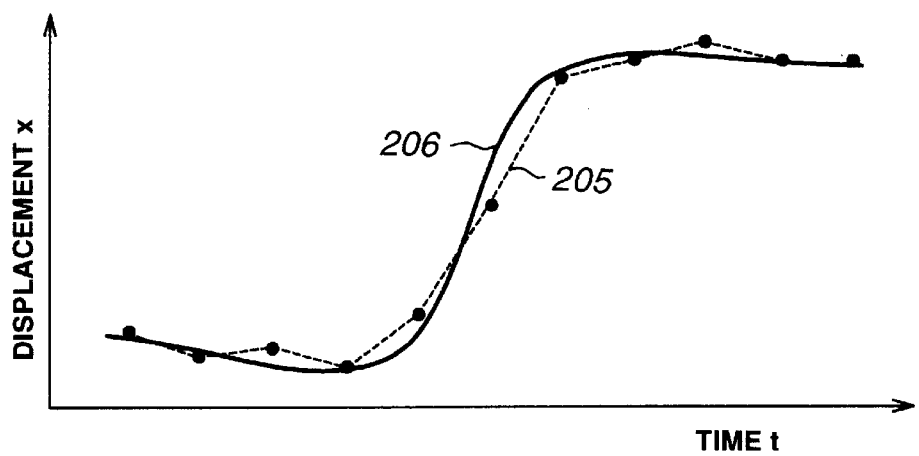
FIGS. 21A, 21B and 21C illustrate weighed smoothing of the corresponding point string.

FIG. 21A shows respective points of the corresponding point string prior to smoothing with black dots. Thus, prior to smoothing, displacement of the corresponding points, observed along the time axis, undergoes fluttering as indicated by broken line. The displacement shown by a solid line is ideal.

Figure 21B:
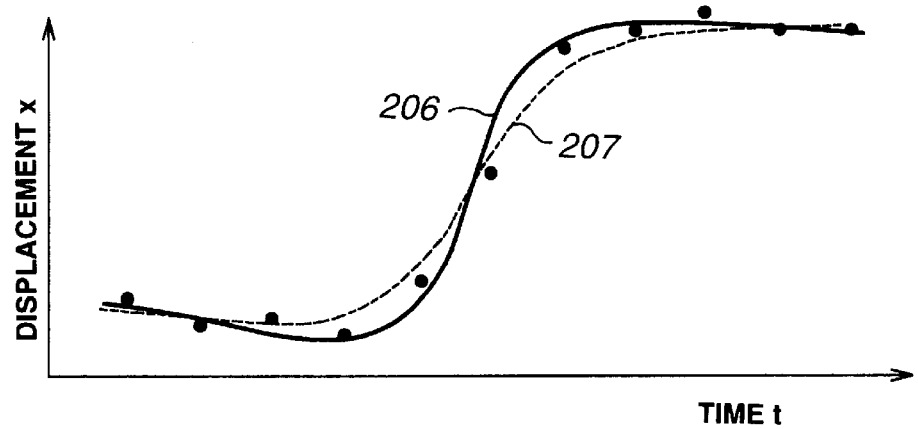

FIG. 21B shows the results of smoothing of the above corresponding point string without taking the weighting coefficients into account. Since smoothing leads to loss of the high frequency components of the displacement of actual corresponding points, drift from the ideal displacement becomes significant at time junctures when the acceleration of motion is significant. This problem may be resolved by setting the weighting coefficient to a larger value at such points as the operator desires to be free of drift. That is, if weighting smoothing is done using the weighting coefficient, the separation between the original corresponding point and the spline can be reduced at time points of a significant value of the weighting coefficient, as a result of which changes in the position of the corresponding point re-extracted after smoothing can be reduced.

Figure 21C:
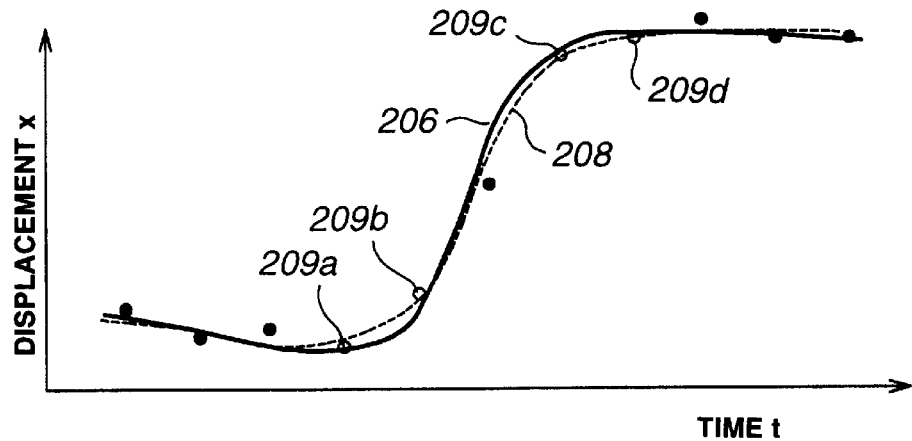

FIG. 21C shows, by a broken line, the results of smoothing in case weighted smoothing is done by enlarging the weighting coefficient of an area having a significant drift. Thus, weighted smoothing leads to more ideal time-series data.

After calculating the corresponding coordinates, smoothed by the smoothing unit 115, the curve re-constructing unit 116 approximates the corresponding points smoothed at respective time junctures by a curve to calculate the curves smoothed at respective time junctures. Using the calculated curve, data in the curve I2(t) storage unit 19 is updated to terminate the processing by the second time-series data generating device.

Next, a curve editing device and a curve editing method embodying the present invention will be explained. In the following description, parts or components common to the above-described time-series data generating device are denoted by the same reference numerals.

Figure 22:
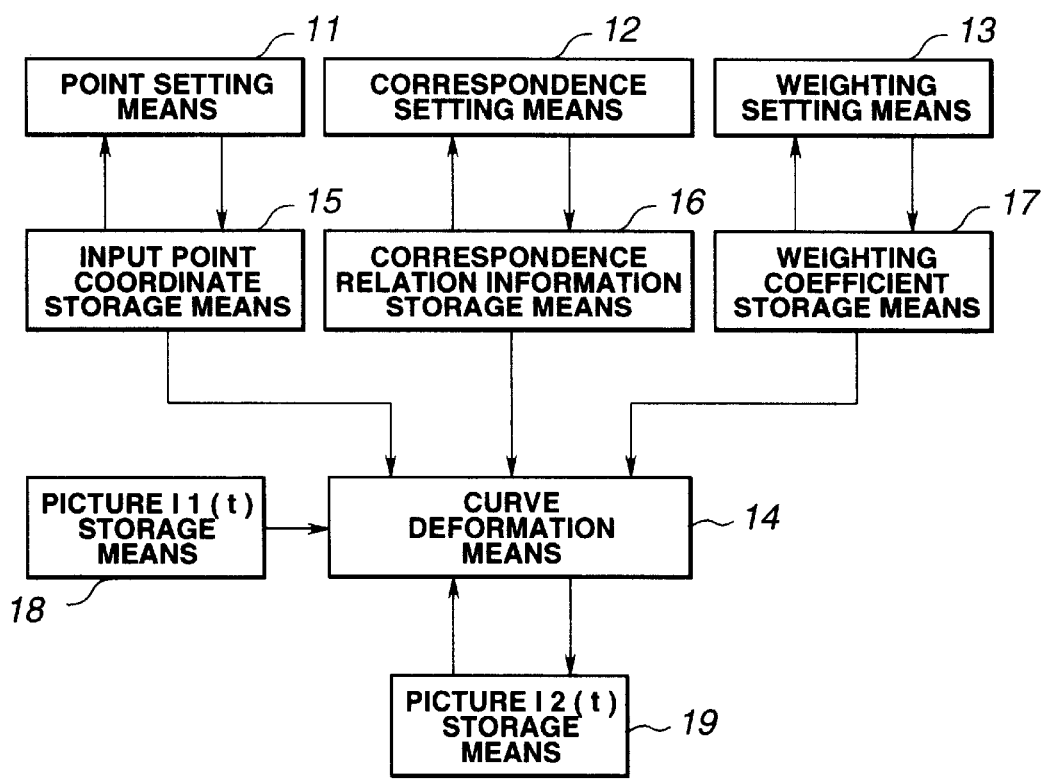
FIG. 22 is a block diagram showing an illustrative structure of a curve editing device according to the present invention.

FIG. 22 is a block diagram showing an illustrative structure of a curve editing device according to the present invention.

This curve editing device can reduce fluttering between frames present in the curve obtained on extracting an object contour from a picture, and is constructed using the above-described time-series data generating device according to the present invention.

By this curve editing device, the operator can designate an area in a curve where curve fluttering between frames exists to execute deforming processing for a designated area to reduce fluttering.

Specifically, the curve editing device includes a point setting unit 11, a correspondence setting unit 12, a weighting setting unit 13, a curve deforming unit 14, an input point coordinate storage unit 15, a corresponding relation information storage unit 16, a weighting coefficient storage unit 17, a picture I1(t) storage unit and a curve I2(t) storage unit 19.

The picture I1(t) and the curve I2(t) are a time sequence images of an object the contour of which is desired to be extracted and a time sequence of extracted contour data.

The input point coordinate storage unit 15 is used for storage of input point positions designated by the operator for curve editing.

The corresponding relation information storage unit 16 is used for storing weighting coefficient values set at the respective input points.

The point setting unit 11, correspondence setting unit 12 and the weighting setting unit 13 operate for updating the contents of the input point coordinate storage unit 15, corresponding relation information storage unit 16 and the weighting coefficient storage unit 17. The operator actuates these units for updating data.

Specifically, pointing devices such as point setting unit 11, correspondence setting unit 12, weighting setting unit 13, a pointing device, such as a tablet pen and a display on a monitor for assisting the input are used.

The operator uses the pointing device to execute the required operations, by having reliance on the guide information, such as the picture on the monitor or display such as curve shape. The above setting units are responsive to the inputs to update the contents of the corresponding data storage units.

The point setting unit 11 accepts position designating inputs on the curve I2(t) to add the designated positions on the input point coordinate storage unit 15. The input point coordinates are used for designating the range of curve deformation and weighting setting of the curve shape.

The correspondence setting unit 12 has the function of designating an optional one input point and designating the corresponding point group to which it belongs. The correspondence setting unit 12 is responsive to the information input by the operator to update the corresponding relation information stored in the corresponding relation information storage unit 16.

In the present embodiment, the corresponding relation is occasionally crucial at an end of an area of a curve desired to be deformed. The input points specifying both ends of an area to be deformed need to have a corresponding relation on the curve at each time juncture.

Figure 23:
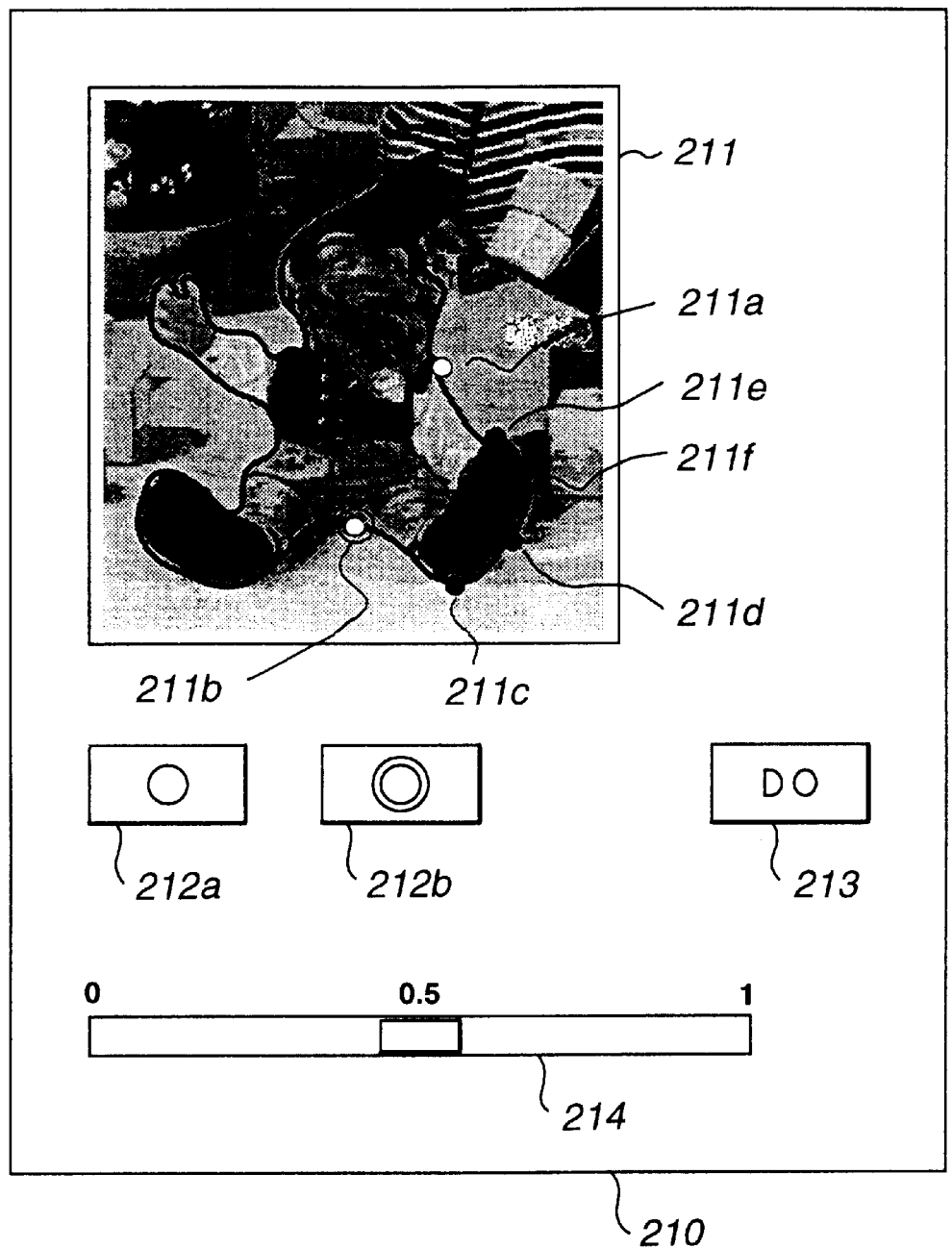
FIG. 23 illustrates a display example on a monitor of the curve editing device according to the present invention.

Thus, as shown in FIG. 23, the curve editing device displays buttons 212a, 212b setting both ends in addition to displaying a picture and a curve on a picture display window 211 of a monitor screen 210.

After selecting input points desired to be used as end points, the operator generates an input event of a pointing device on the buttons 212a, 212b. By this, the selected point is designated as belonging to the corresponding point group of the end points thus updating the information stored in the corresponding relation information storage unit 16.

The weighting setting unit 13 has the function of designating an optional input point and designating its weighting coefficient so that it updates the data stored in the weighting coefficient storage unit 13 by the operator inputting the information.

The curve editing device is designed so that the operator can designate the weighting coefficient value by displaying a weight count value scale bar 214 on the monitor screen 210. If the operator generates an input event on the scale bar, the weighting coefficient value is calculated by the ratio of internal division of an input device having one and the other ends of the weight count value scale bar 214 as weight 0 and weight 1, respectively. This updates the weighting coefficient value of the selected input point.

The curve deforming unit 14 deforms the curve I2(t) for reducing fluttering between curves based on the contents of three data storage units concerning the above input point.

With the present curve editing device, if a curve deforming executing button 213 is displayed on the monitor screen 210 and an input event of the pointing device occurs on this curve deforming unit 14, the processing of the curve deforming unit 14 is executed. The curve deforming unit 14 may be configured as the above-described second time-series data generating device.

The curve editing device according to the present invention is now explained.

Figure 24:
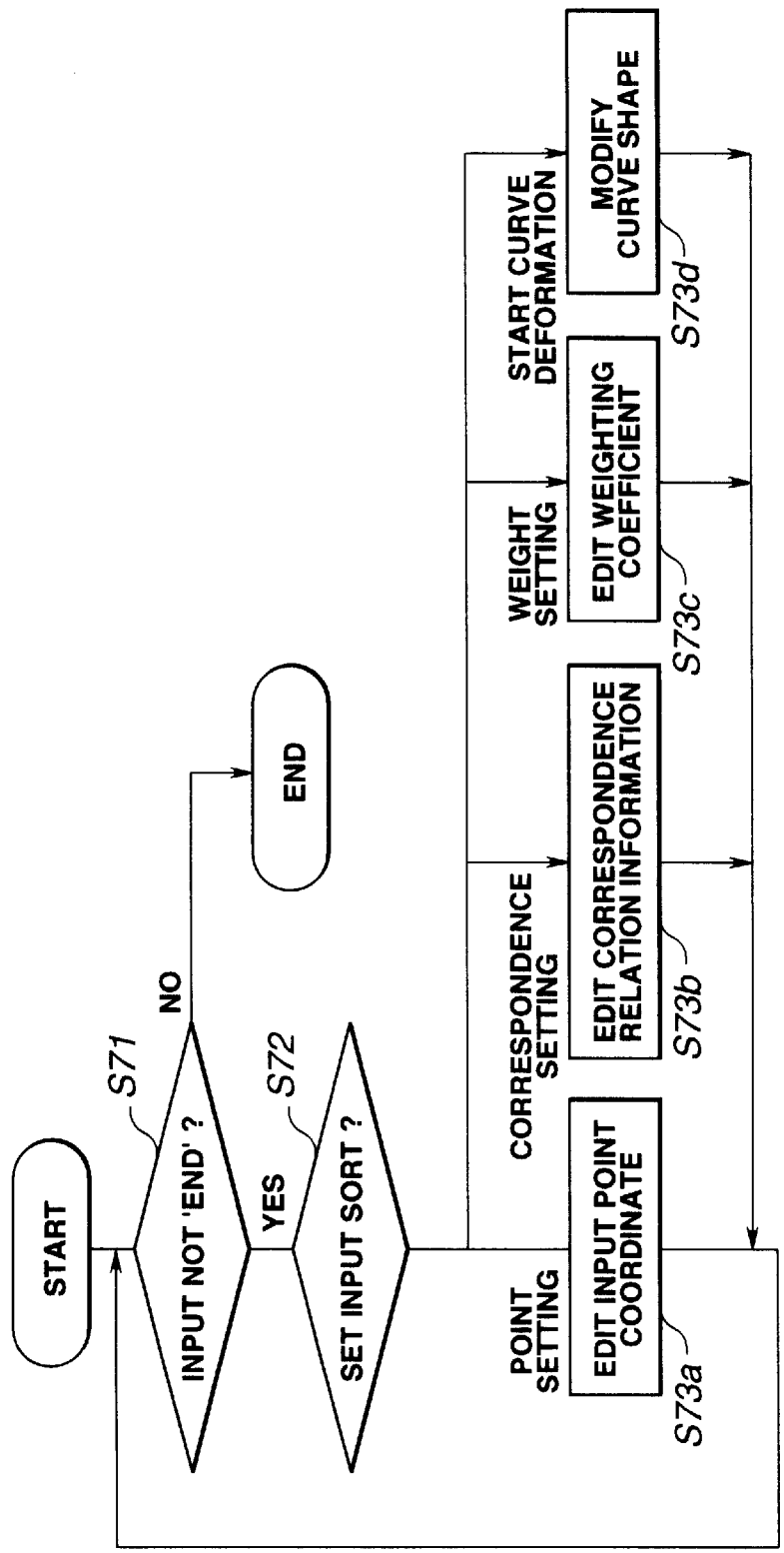
FIG. 24 is a flowchart showing a basic processing sequence in the curve editing method according to the present invention.

FIG. 24 is a flowchart showing the basic processing sequence in the curve editing method according to the present invention. The processing sequence is explained with reference to FIG. 24.

First, at step S71, it is judged whether or not the next input by the operator is an input indicating 'end'. If the input indicates 'end', the processing is terminated and, if otherwise, processing transfers to step S72.

Then, at step S72, the sort of the setting input is judged.

If the input is 'point set', input point coordinate data is updated, based on the input, at step S73a, before processing reverts to step S71.

If the input is 'correspondence set', input point coordinate data is updated, based on the input, at step S73b, before processing reverts to step S71.

If the input is 'weight set', the weighting coefficient data is updated, based on the input, at step S73c, before processing reverts to step S71.

If the input is 'start curve deformation', curve shape deformation processing is executed at step S73d to update the curve I2(t). Then, processing reverts to step S71 to repeat the above processing.

In the above-described curve editing device according to the present invention, the processing on weighting coefficient may be omitted in its entirety. Alternatively, the portion of the structure of the evaluated value calculating unit 108 in FIG. 8 pertinent to the similarity calculating portion may also be omitted. Still alternatively, the portion of the structure of the evaluated value calculating unit 108 designed to calculate the distance may also be omitted.

In the curve editing device of the present invention, spline curves as shown in FIG. 19 is used as the smoothing unit 115. The smoothing unit may, however, be such a structure producing smoothed data at each time juncture of the time domain and may use weighted mean or a discrete filter, such as a rank filter.

Then, a modified structure of the curve editing device, corresponding to the above-described structure of the curve editing device according to the present invention, referred to herein a second curve editing device, is explained.

In the curve editing device of the present invention, since the position of the input point stored in the input point coordinate storage unit is deviated from a portion on the curve I2(t) after reducing the fluttering of the curve I2(t) by curve deformation, the input point cannot be re-exploited.

The second curve editing device, now explained, is based on the above-described curve editing device, and is configured for re-exploiting the pre-entered input points even after curve deformation. This improves the efficiency of the curve editing operation.

The second curve editing device and method are hereinafter explained mainly with reference to different portions to be added to the above-described curve editing device and method. The parts or components common to the above-described curve editing device and method are indicated by the same reference numerals.

Figure 25:
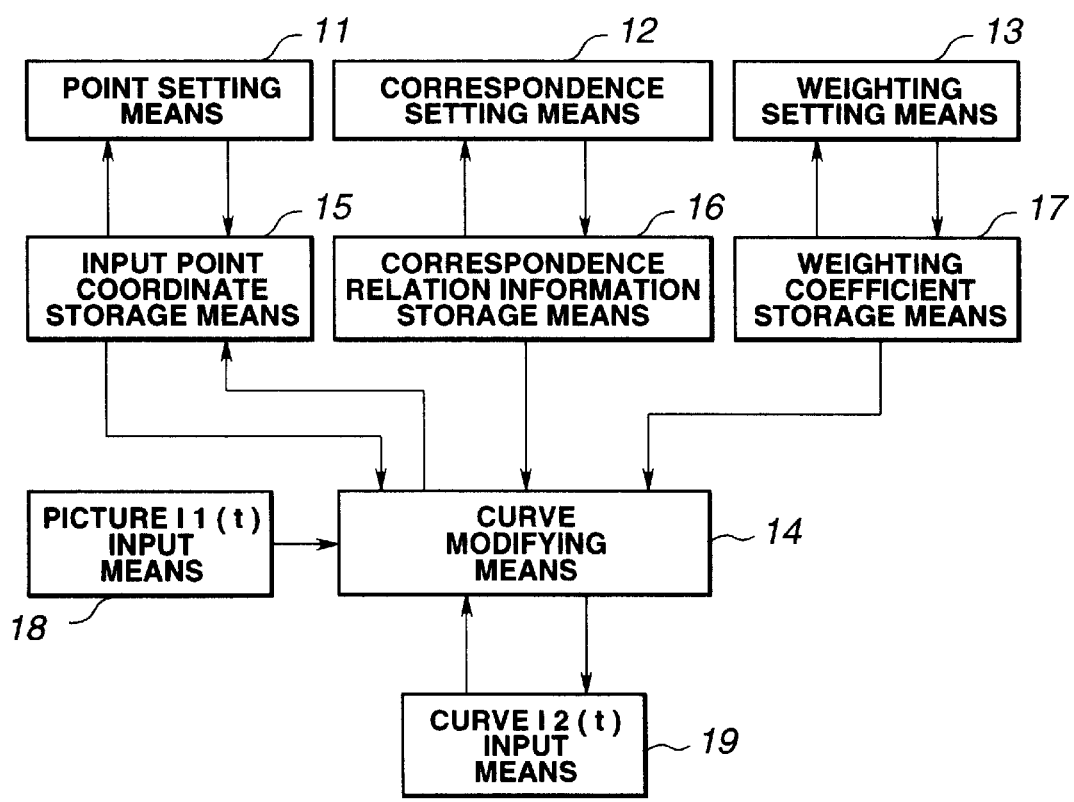
FIG. 25 is a block diagram showing an illustrative structure of a second curve editing device according to the present invention.

FIG. 25 is a block diagram showing an illustrative structure of the second curve editing device.

The structure of the second curve editing device, similar to that of the above-described curve editing device, differs therefrom in that a curve modifying unit 14 corrects the position of an input point coordinate after curve deformation so that the input point coordinate will lie on the deformed curve in order to update data stored in the input point coordinate storage unit 15.

Figure 26:
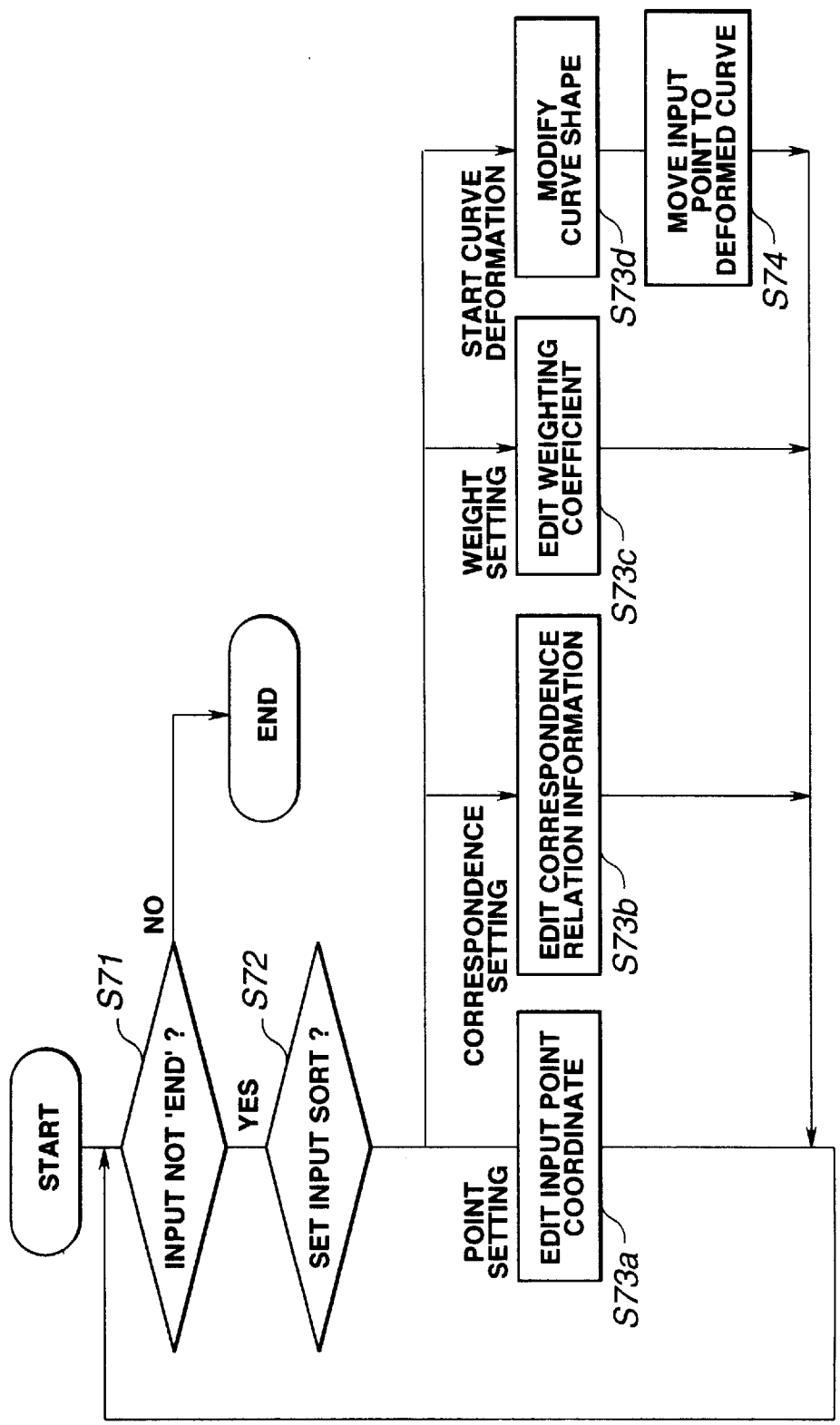
FIG. 26 is a flowchart showing a basic processing sequence in the second curve editing device according to the present invention.

FIG. 26 shows the flowchart illustrating the basic processing sequence in this second curve editing device.

The processing sequence is similar to that from step S71 to step S73 in the above-described curve editing device. However, if the type of the setting input judged at step S72 is 'curve deformation start', curve deforming processing is performed at step S73d and then the input point coordinate is moved at step S74 to a deformed curve.

Figure 27:
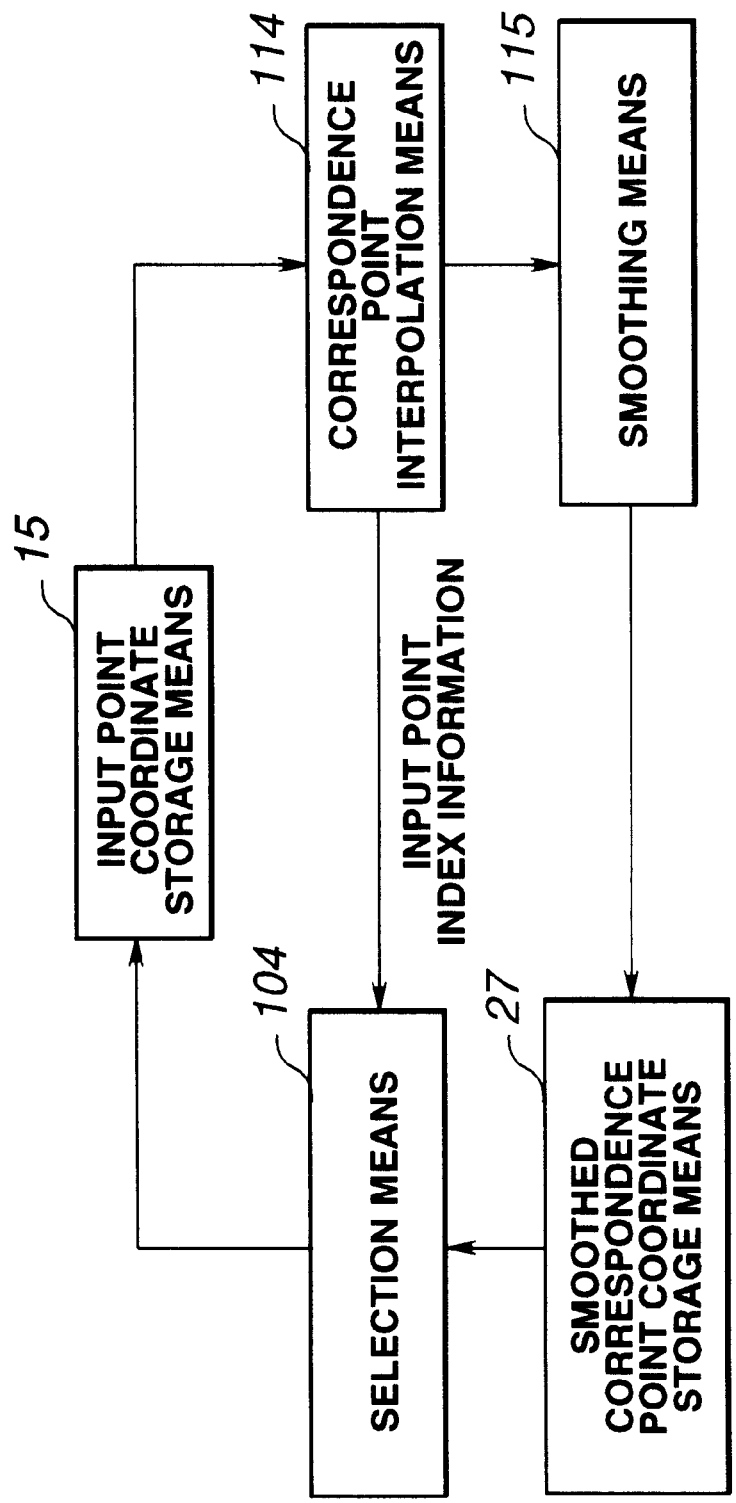
FIG. 27 is a block diagram showing a portion for input point coordinate updating processing of the second curve editing device.

FIG. 27 is a block diagram showing a portion of the second curve editing device carrying out the updating of the input point coordinates.

In this second curve editing device, the input point coordinates are interpolated by candidate point interpolating unit 114 and the positions thereof are smoothed by the smoothing unit 115. The results are stored in a smoothed candidate point coordinate storage unit 27.

In the second curve editing device, the following processing is added. That is, the corresponding point interpolation unit 114 calculates to which of the interpolated candidate points each input point corresponds and the corresponding information is stored in the index information storage unit 28 of the input points, as explained with reference to FIG. 17. This feature is exploited in this second curve editing device. This permits the candidate points corresponding to the input points to be sequentially extracted from the smoothed candidate point coordinate storage unit 27 by the selection unit 104 to update data stored in the input point coordinate storage unit 15.

Figure 28:
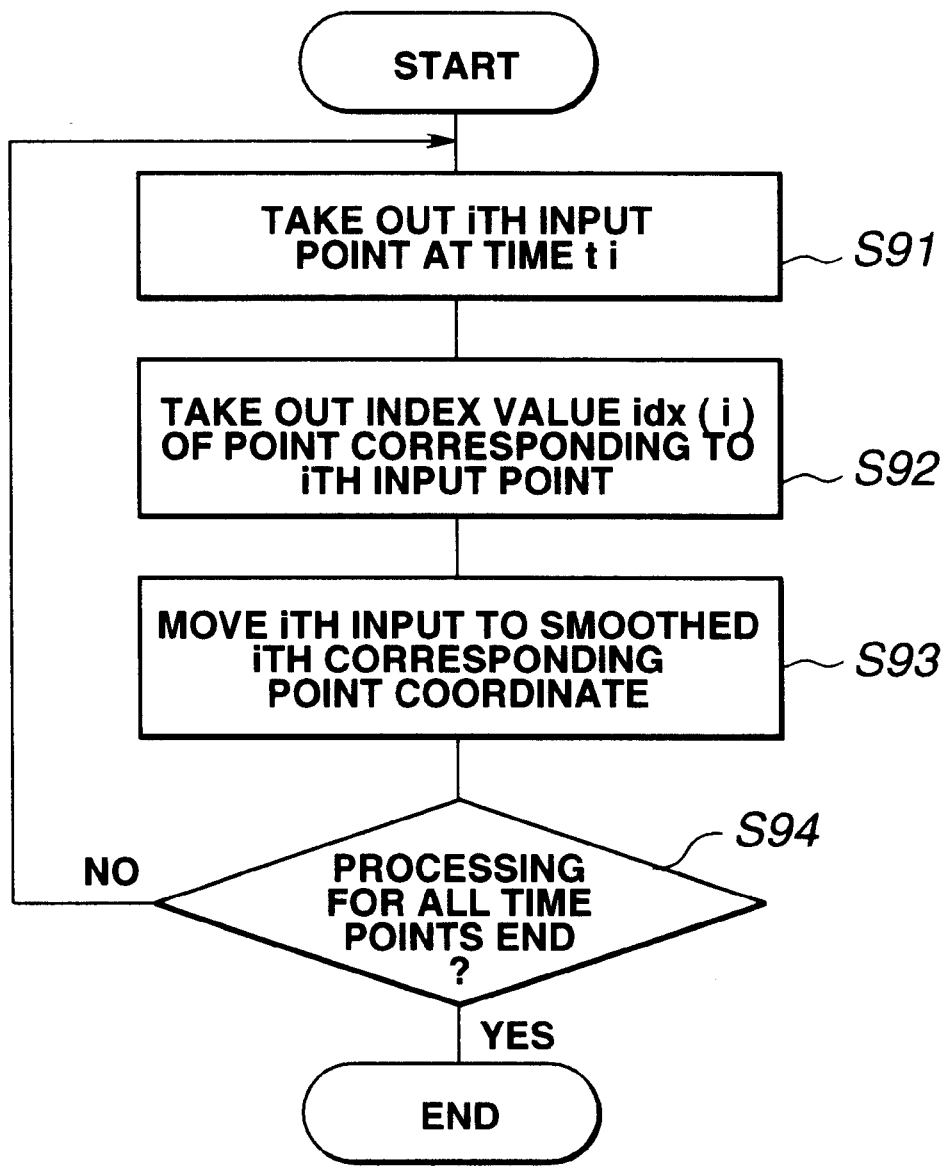
FIG. 28 is a flowchart for illustrating the input point coordinate updating processing.

FIG. 28 is a flowchart showing the processing sequence of updating the input point coordinates described above.

Referring to FIG. 28, the operation of updating the input point coordinates is explained.

First, at step S91, an ith input point set at time juncture ti is extracted from the input point coordinate storage unit 15.

Then, at step S92, an index value idx(i) of a candidate point corresponding to the ith input point is taken out at step S92 from an index information storage unit 28.

Then, at step S93, the idx(i)th smoothed candidate point, specified by the index value idx(i), is extracted from the corresponding point coordinate storage unit 25 to update data stored in the input point coordinate storage unit 15 with the coordinate.

At step S94, it is judged whether or not the processing for all time junctures has come to a close. If the processing for all time junctures has come to a close, the above processing is terminated and, if otherwise, processing reverts to step S91 to repeat the input point coordinate updating processing.

Figure 29:
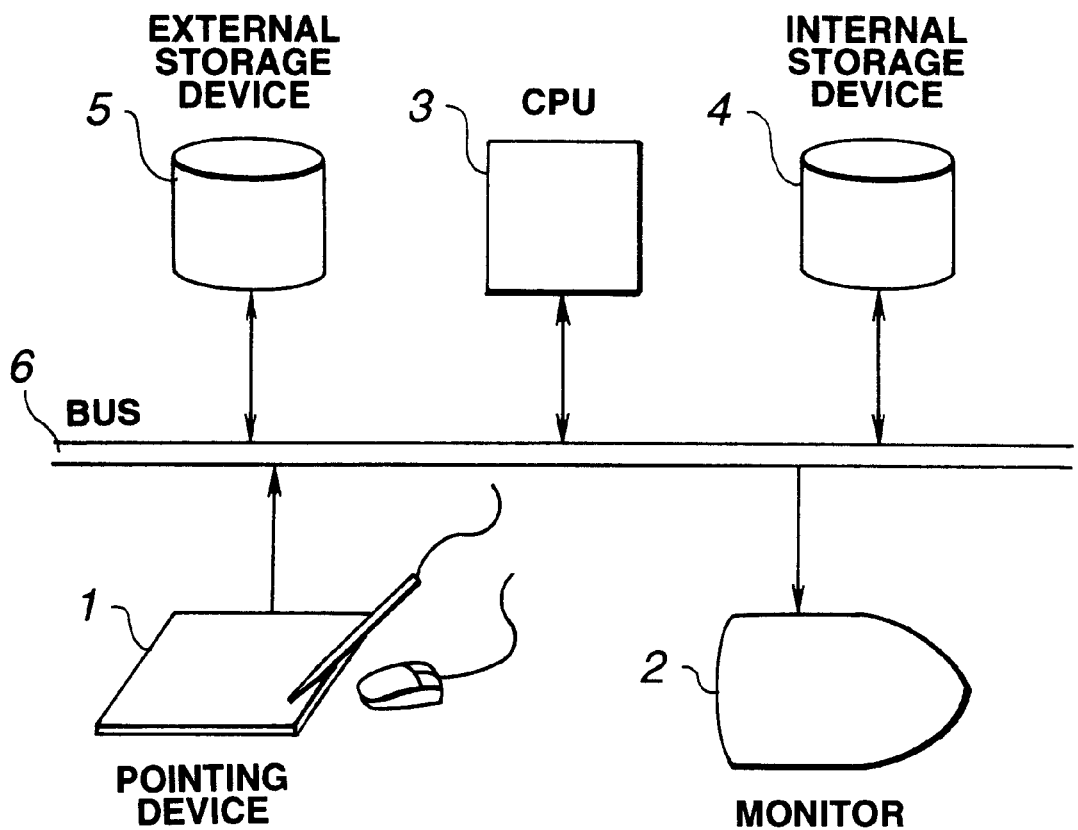
FIG. 29 shows a basic illustrative structure of a time-series data generating device and a curve editing device according to the present invention.

FIG. 29 shows the basic structure of a time-series data generating device and a curve editing device according to the present invention.

Each of these devices includes a pointing device 1, as an input/output interface between the device and the operator, a monitor 2, a CPU 3, an internal storage device 4, an external storage device 5 and a bus 6 interconnecting these devices.

The pointing device 1 is means for retrieving an input by an operator and may be a mouse or a tablet pin. The monitor 2 is means for displaying data, such as a picture or figure, for the operator, and may, for example, be a CRT.

The CPU 3 is a central processing unit taking charge of calculations or control in the present invention. The internal storage device 4 is data storage means for transiently storing data required in executing a variety of processing operations according to the present invention.

The external storage device 5 is also used as a supplementary storage unit for storing data required in processing or as input/output for data such as results of the processing operations.

In the above-described configuration of the present invention, data of the picture I1(t) and curve I2(t) are separately produced by an appropriate method so as to be stored in the external storage device 5 or the internal storage device 6.

There is no particular limitation to the method for generating these data since it suffices if the method is such a technique which generate a curve such as the contour of an object from the picture.

Specifically, a technique disclosed in the Japanese Laying-Open Publication H4-152481 entitled 'picture contour detection method' or in Japanese Laying-Open Publication H4-254854 entitled 'slicing mask forming method and apparatus' may be used. There may also be used such techniques disclosed in the Japanese Laying-Open Publication H3-17680 entitled 'area extraction method', Japanese Laying-Open Publication H8-312740 entitled 'contour extraction device and method', and Japanese Laying-Open Publication H9-204862 entitled 'path search device and method, contour curve generating device and method, contour curve editing device ad method and a program recording medium', all assigned to the present assignee.

What is claimed is:

1. A time-series data generating apparatus for generating, from time series I(t) of data distributed in space, time series P(t) of corresponding coordinates, comprising:

interpolation curve generating means for receiving an incomplete set of said corresponding coordinates as input for generating an interpolation curve C(t) interconnecting said coordinates;

candidate point extraction means for receiving said interpolation curve C(t) and a time series I(t) of data as inputs for extracting a group of candidate points Q of a coordinate P(ts) to be found at a time juncture ts devoid of a corresponding coordinate from the neighborhood of a position C(ts) of the interpolation curve at time ts;

evaluated value calculating means for receiving said time ts, interpolation curve C(t), time series of data I(t) and a candidate point q of the group of candidate points as inputs for calculating an evaluated value e(q) for the candidate point q; and candidate point selection means for receiving said evaluation value e(q) as an input for detecting the point q having the maximum or minimum evaluation value E.

2. The time-series data generating apparatus according to claim 1 wherein the time series of data is a curve I(t) and wherein said evaluated value calculating means includes distance calculating means for calculating the distance between the position C(ts) of an interpolation curve at a time juncture ts and the candidate point q.

3. The time-series data generating apparatus according to claim 1 wherein the time series of data is a picture I(t) and wherein said evaluation value calculating means includes similarity calculation means for calculating similarity between a partial picture in the neighborhood of the candidate point q and a partial picture in the neighborhood of the input coordinate P(ti) at a time juncture ti in which the corresponding coordinate P(ti) has been entered.

4. The time-series data generating apparatus according to claim 1 wherein the time series of data is a curve I2(t) present on a picture I1(t) and wherein said evaluation value calculating means includes distance calculating means for calculating the distance between the position C(ts) of the interpolation curve at time juncture ts and the candidate point q and similarity calculation means for calculating similarity between a partial picture in the neighborhood of the candidate point q and a partial picture in the neighborhood of the input coordinate P(ti) at a time juncture ti in which the corresponding coordinate P(ti) has been entered.

5. A time-series data generating method for generating, from time series I(t) of data distributed in space, time series P(t) of corresponding coordinates, comprising the steps of:

an interpolation curve generating step for receiving an incomplete set of said corresponding coordinates as input for generating an interpolation curve C(t) interconnecting said coordinates;

a candidate point extraction step of receiving said interpolation curve C(t) and the time series of data as inputs for extracting, from the neighborhood of the position C(ts) of the interpolation curve at time ts, a group Q of candidate points of the coordinates P(ts) to be found at time ts for which a corresponding coordinate has not been acquired;

an evaluated value calculating step of receiving the time juncture ts, interpolation curve C(ts), time series of data I(t) and a candidate point of the group Q of candidate points as inputs for calculating an evaluated value e(q) for the candidate point; and a candidate point selection step for detecting the point q having the maximum or minimum evaluation value E.

6. The time-series data generating method according to claim 5 wherein the time series of data is a curve I(t) and wherein said evaluated value calculating step includes a distance calculating step for calculating the distance between the position C(ts) of an interpolation curve at a time juncture ts and the candidate point q.

7. The time-series data generating method according to claim 5 wherein the time series of data is a picture I(t) and wherein said evaluation value calculating step includes a similarity calculation step for calculating similarity between a partial picture in the neighborhood of the candidate point q and a partial picture in the neighborhood of the input coordinate P(ti) at a time juncture ti in which the corresponding coordinate P(ti) has been entered.

8. The time-series data generating method according to claim 5 wherein the time series of data is a curve I2(t) present on a picture I1(t) and wherein said evaluation value calculating step includes distance calculating means for calculating the distance between the position C(ts) of the interpolation curve at time juncture ts and the candidate point q and a similarity calculation step for calculating similarity between a partial picture in the neighborhood of the candidate point q and a partial picture in the neighborhood of the input coordinate P(ti) at a time juncture ti in which the corresponding coordinate P(ti) has been entered.

9. A recording medium having recorded thereon a time-series data generating program for generating, from time series I(t) of data distributed in space, time series P(t) of corresponding coordinates, said time series data generating program comprising the steps of:

an interpolation curve generating step for receiving an incomplete set of said corresponding coordinates as input for generating an interpolation curve C(t) interconnecting said coordinates;

a candidate point extraction step of receiving said interpolation curve C(t) and the time series of data as inputs for extracting, from the neighborhood of the position C(ts) of the interpolation curve at time ts, a group Q of candidate points of the coordinates P(ts) to be found at time ts for which a corresponding coordinate has not been acquired;

an evaluated value calculating step of receiving the time juncture ts, interpolation curve C(ts), time series of data I(t) and a candidate point of the group Q of candidate points as inputs for calculating an evaluated value e(q) for the candidate point; and a candidate point selection step for detecting the point q having the maximum or minimum evaluation value E.

10. A time-series data generating apparatus for generating, from time series I(t) of data distributed in space, time series P(t) of corresponding coordinates, comprising:

corresponding point interpolation means for receiving a time series of a curve i(t) and an incomplete set of candidate points representing the relation between curves at each time juncture for interpolating said incomplete set of candidate points;

smoothing means for smoothing the interpolated candidate points along the time axis; and curve re-constructing means for re-constructing a curve shape form smoothed corresponding points.

11. The time-series data generating apparatus according to claim 10 wherein said corresponding point interpolation means includes evaluation value calculating means for calculating the distance between the position C(ts) of the interpolation curve at time ts and the candidate point q for finding a corresponding point at a time juncture ts for which there lacks a coordinate for a given corresponding point.

12. The time-series data generating apparatus according to claim 10 wherein said corresponding point interpolation means includes evaluation value calculating means for calculating the distance between the position C(ts) of the interpolation curve at time ts and the candidate point q for finding a corresponding point at a time juncture ts for which there lacks a coordinate for a given corresponding point; and similarity calculating means for calculating similarity between a picture in the neighborhood of the candidate point q and a picture in the neighborhood of an input coordinate P(ti) at a time point ti at which the corresponding coordinate has been entered.

13. The time-series data generating apparatus according to claim 10 wherein said corresponding point interpolation means includes weighting coefficient interpolation means for receiving time series of a curve I(t), an incomplete set of coordinate points showing the corresponding relation between curves at each time juncture and weighting coefficients of the corresponding points as inputs for determining weighting coefficient values of the corresponding points interpolated by interpolating the input weighting coefficient values;

said smoothing means doing weighted smoothing using the weighting coefficients of the corresponding points.

14. The time-series data generating apparatus according to claim 10 wherein said smoothing means generates a spline curve from said corresponding points.

15. A time-series data generating method for generating, from time series I(t) of data distributed in space, time series P(t) of corresponding coordinates, comprising the steps of:

a corresponding point interpolating step of receiving time series I(t) of a curve and an incomplete set of corresponding points representing the corresponding relation between curves at respective time junctures, as inputs, for interpolating incomplete coordinates;

a smoothing step of smoothing the interpolated corresponding points along the time axis; and a curve re-constructing step of the curve shapes at the respective time junctures from the smoothed corresponding points.

16. The time-series data generating method according to claim 15 wherein said corresponding point interpolation step includes an evaluation value calculating step for calculating the distance between the position C(ts) of the interpolation curve at time ts and the candidate point q for finding a corresponding point at a time juncture ts for which there lacks a coordinate for a given corresponding point.

17. The time-series data generating method according to claim 15 wherein said corresponding point interpolation step includes an evaluation value calculating step for calculating the distance between the position C(ts) of the interpolation curve at time ts and the candidate point q for finding a corresponding point at a time juncture ts for which there lacks a coordinate for a given corresponding point; and a similarity calculating step for calculating similarity between a picture in the neighborhood of the candidate point q and a picture in the neighborhood of an input coordinate P(ti) at a time point ti at which the corresponding coordinate has been entered.

18. The time-series data generating method according to claim 15 wherein said corresponding point interpolation step includes a weighting coefficient interpolation step for receiving time series of a curve I(t), an incomplete set of coordinate points showing the corresponding relation between curves at each time juncture and weighting coefficients of the corresponding points as inputs for determining weighting coefficient values of the corresponding points interpolated by interpolating the input weighting coefficient values;

said smoothing step doing weighted smoothing using the weighting coefficients of the corresponding points.

19. The time-series data generating method according to claim 15 wherein said smoothing step generates a spline curve from said corresponding points.

20. A recording medium having a time-series data generating program for generating, from time series I(t) of data distributed in space, time series P(t) of corresponding coordinates, said time-series data generating program comprising the steps of:

a corresponding point interpolating step of receiving time series I(t) of a curve and an incomplete set of corresponding points representing the corresponding relation between curves at respective time junctures, as inputs, for interpolating incomplete coordinates;

a smoothing step of smoothing the interpolated corresponding points along the time axis;

and a curve re-constructing step of the curve shapes at the respective time junctures from the smoothed corresponding points.

21. A curve editing apparatus for smoothing corresponding points on each contour curve of a time series of a contour curve along the time axis for reducing displacements along the time axis between the contour curves, comprising:

point setting means for setting points at optional positions on the curves at optional time juncture of the time series of a contour curve I(t);

corresponding setting means for setting whether or not each point is a corresponding point;

weighting setting means for setting weighting coefficients of respective points; and curve deforming means for receiving a time series of a curve I(t) and an incomplete set of coordinate points representing the corresponding relation between curves at respective time junctures as inputs for interpolating the incomplete coordinate points, smoothing the interpolated corresponding points along the time axis and for re-constructing a curve at each time juncture from the smoothed corresponding points at a time.

22. A curve editing method for smoothing corresponding points on each contour curve of a time series of a contour curve along the time axis for reducing displacements along the time axis between the contour curves, comprising the steps of:

a point setting step for setting points at optional positions on the curves at optional time juncture of the time series of a contour curve I(t);

a corresponding setting step for setting whether or not each point is a corresponding point;

a weighting setting step for setting weighting coefficients of respective points; and a curve deforming step for receiving a time series of a curve I(t) and an incomplete set of coordinate points representing the corresponding relation between curves at respective time junctures as inputs for interpolating the incomplete coordinate points, smoothing the interpolated corresponding points along the time axis and for re-constructing a curve at each time juncture from the smoothed corresponding points at a time.

23. A recording medium having recorded thereon a curve editing program for smoothing corresponding points on each contour curve of a time series of a contour curve along the time axis for reducing displacements along the time axis between the contour curves, said curve editing program comprising the steps of:

a point setting step for setting points at optional positions on the curves at optional time juncture of the time series of a contour curve I(t);

a corresponding setting step for setting whether or not each point is a corresponding point;

a weighting setting step for setting weighting coefficients of respective points; and a curve deforming step for receiving a time series of a curve I(t) and an incomplete set of coordinate points representing the corresponding relation between curves at respective time junctures as inputs for interpolating the incomplete coordinate points, smoothing the interpolated corresponding points along the time axis and for re-constructing a curve at each time juncture from the smoothed corresponding points at a time.

* * * * *

UNITED STATES PATENT AND TRADEMARK OFFICE
CERTIFICATE OF CORRECTION

PATENT NO.     : 6,298,155 B1
DATED          : October 2, 2001
INVENTOR(S)    : Mitsunaga et al.

It is certified that error appears in the above-identified patent and that said Letters Patent is hereby corrected as shown below:

<u>Title page,</u>
Item [75], please remove from the list of inventors "John Zeiss, Stanford, CT (US) --.

Signed and Sealed this

Third Day of September, 2002

*Attest:*

*Attesting Officer*

JAMES E. ROGAN
*Director of the United States Patent and Trademark Office*